United States Patent [19]

Mayer et al.

[11] Patent Number: 4,492,718
[45] Date of Patent: Jan. 8, 1985

[54] ROTATION COATING OF DISK SUBSTRATE WITH ACRYLATE PREPOLYMER

[75] Inventors: Thomas Mayer; Michael D. Temple; Norman L. Boling; James D. Rancourt, all of Santa Rosa, Calif.

[73] Assignee: Burroughs Corporation, Detroit, Mich.

[21] Appl. No.: 450,779

[22] Filed: Dec. 17, 1982

[51] Int. Cl.³ .............................................. B05B 5/00
[52] U.S. Cl. .................................. 427/160; 427/54.1; 427/164; 427/240; 427/336
[58] Field of Search .................. 427/54.1, 160, 164, 427/240, 336, 286, 335

[56] References Cited

U.S. PATENT DOCUMENTS

| | | | |
|---|---|---|---|
| 3,342,754 | 9/1967 | Gorham | 428/195 X |
| 4,101,907 | 7/1978 | Bell et al. | 346/76 L X |
| 4,195,312 | 3/1980 | Bell et al. | 430/271 |
| 4,195,313 | 3/1980 | Bell et al. | 346/76 L X |
| 4,216,501 | 8/1980 | Bell | 346/76 L X |
| 4,222,071 | 9/1980 | Bell et al. | 346/76 L X |
| 4,334,233 | 6/1982 | Murakami | 346/135.1 |
| 4,334,299 | 6/1982 | Kumurasaki et al. | 369/54 X |

Primary Examiner—Thurman K. Page
Attorney, Agent, or Firm—John J. McCormack; Nathan Cass; Kevin Peterson

[57] ABSTRACT

An optical data storage system is contemplated, one employing a data-modulated writing laser beam (FIG. 2: (L)) with improved associated optical media (FIG. 2), these characterized by multiple layers (FIG. 2:c,d,e,f,g)—more particularly, a highly reflective aluminum layer (c), a relatively transparent polymer spacer layer (d) overlying the reflective layer, and an optical absorber (recording) layer (e) overlying the spacer layer, plus an overcoating structure, e.g., as a "soft pad" layer (f; e.g., a fluoropolymer) on the absorber, with a "Hard" layer (g; e.g., a radiation-cured acrylic) laid over the "soft pad" as an outer protective overcoat. "Spiral" coating techniques (FIG. 3) are specified for applying the "Hard" layer.

24 Claims, 8 Drawing Figures

$O-C = f+g$
$T-L = c+d+c$
$S' = A+B$

| RADIAL POSITION ($d_b$) | TABLE SPEED ($w_d$) | PT | SLIDE SPEED ($v_a$) |
|---|---|---|---|
| 7.00 | 3.20 rpm | a | 2.35 cm/sec |
| 6.30 | 3.40 | b | 2.50 |
| 6.05 | 3.60 |   | 2.10 |
| 5.50 | 3.80 | c | 2.00 |
| 4.30 | 4.65 |   | 2.35 |
| 4.10 | 4.80 |   | 2.70 |
| 3.65 | 5.40 |   | 3.45 |
| 3.35 | 5.90 |   | 4.00 |
| 3.25 | 6.25 | d | 4.50 |
| 3.00 | 7.20 |   | 5.00 |

I. TO BE RPM ($\sim\omega_d$)
 II. SLIDER CIN-VELOC. (DIFFERENT SCALE) -- $v_a$

ROTATION COATING OF DISK SUBSTRATE WITH ACRYLATE PREPOLYMER

The present invention relates to a novel high density information storage medium, and more particularly to such a medium including a recording layer adapted for optical data recording having protective overcoat means and related coatings adapted to enhance recording characteristics.

RELATED CASES

These co-inventors have filed the following on Dec. 17, 1982 U.S. Ser. Nos. 450,779 and 450,805.

INTRODUCTION, BACKGROUND

Optical storage of digital data is a relatively new technology, concerned with the storage and retrieval of digital information utilizing optical techniques and using a special related (ODD, "optical digital data") medium, such as an ODD disk. By analogy such data is conventionally stored on magnetic media like tapes or disks commonly used with high speed digital computers today.

Here described are some novel approaches to making a sensitive optical recording medium for digital data, resisting oxidation or like environmental degradation, wherein sensitivity is improved, extended life is feasible and fabrication parameters are simplified over what is now conventional.

Various types of protective overcoatings for such media have been suggested by workers, especially relative to "tuned media" (e.g., media using a "dark mirror" effect; for instance see U.S. Pat. No. 4,222,071 to Bell, et al; also see "Review of Optical Storage Media" by Zech, SPIE Vol. 177, Optical Information Storage, 1979, page 56, et sequ.; also see "Optical Recording Media Review" by Bartolini, page 2, et sequ. of 1977 SPIE Vol. 123, "Optical Storage Materials and Methods"; and see "Melting Holes in Metal Films for Real-Time High Density Data Storage" by Cochran and Ferrier, SPIE Proceedings, August 1977, pages 17-31; and other citations below).

Extended Archival life:

Optical data storage technology is attractive because it promises increased storage capacity. An optical data disk as here contemplated will be assumed to store information thereon for an extended archival life; the goal is 5-10 years or more under typical, and extreme, service conditions for data processing (DP) apparatus. Such extended life is a goal as yet unattained in the art, though workers have long striven towards it. The present invention points toward improved ODD media better adapted for such archival life; media which are especially adapted for "optical mass memory" and like applications, with emphasis on improved overcoat and/or spacer means.

Thus, as a feature hereof, we contemplate the use of novel spacer and/or overcoat structure and materials for records which preferably exhibit extended archival life, i.e., records which are made extremely resistant to oxidation or like environmental degradation during typical DP storage and use (thus, with little or no "loss" of recorded information occurring over extended storage life, with reflectivity remaining stable enough to "read"—something no practical storage medium or associated system can yet provide; especially where "good" sensitivity is also required. The invention teaches means toward this end.

Novel "spacer layer":

Further, according to a salient aspect hereof, the spacer layer (e.g., in such a "dark mirror" arrangement) may preferably comprise a "soft pad" which is vapor-deposited on a reflector layer, and upon which the absorber (recording) layer may in turn be deposited. This spacer layer may comprise a so-deposited fluoropolymer which is highly transparent to the contemplated read-write wavelengths and which also provides good thermal and mechanical insulation, isolating the absorber layer from the reflector layer, (note the reflector is typically a highly conductive metal which could otherwise function as a heat sink, draining recording energy away from the absorber layer and reducing its effectiveness).

Thus, as further described below, for one example we prefer a vacuum-evaporated fluoropolymer, like polytetrafluoroethylene (PTFE) or fluorinated ethylene propylene copolymer (FEP).

It has been somewhat conventional to specify a hard silicate coating (silicon oxide or silicon dioxide—cf "fused silica") for such a spacer (e.g., see U.S. Pat. Nos. 4,195,312 or 4,195,313 or 4,216,501 to Bell, et al). However, such material cannot satisfy all the thermal and mechanical objectives here set out. For one thing, such silicate coatings conduct heat too readily. For example, a "low-energy" recording pulse (moderate-to-low power for about 40 n.sec) has difficulty recording when a single quarter-wave optical thickness of $SiO_2$ is used (atop Al reflector)—this very thin spacer evidently allows too much recording heat to escape and be wasted. To prevent this, thicker spacer layers are possible, of course; however, thicker $SiO_2$ layers can complicate and degrade production processes, especially because they typically will constrict the absorber and drop sensitivity and because they can narrow the bandwidth where low reflectivity obtains (cf. "Design and Production of Tellurium Optical Data Disk" by J. Rancourt, SPIE Proceedings; Advances in Laser Scan Technology, page 57 Vol. 299, 1981).

Moreover, if several well-separated read/write R/W) wavelengths are to be used, spacer production becomes even more complex since more (thickness) control is required to accurately position the necessary wavelength "minima". (Note: One wants to efficiently couple light energy to the absorbing layer of a "tri-layer"; hence, to "write" by increasing the reflectivity of a bit site, one wants an unwritten background of relatively low reflectivity, at contemplated R/W wavelengths). Conversely, a simple "soft pad" (e.g. fluoropolymer) spacer using this teaching appears to affect sensitivity much less; also it affords a broad reflectance minimum (λ) by virtue of being only a single quarter-wave and can therefore function at many R/W wavelengths simultaneously.

One aspect of this disclosure is to teach the preparation and use of such a "soft pad" spacer material, including associated deposition methods, and especially such apt for such OD disks—and even more especially such which are typically convenient for low-energy recording with present laser equipment (e.g., writing with a He-Ne laser in a 5-20 mW/40 n.sec pulse—cf 25 MHz rate).

Overcoat: generally:

The so-recorded spots ("bits") are contemplated as being about one micrometer in diameter. But surface "dirt" (e.g., oil, fingerprints) or particulate contaminants, such as air-borne dust, are this large, or larger, and thus can obstruct a recorded "bit". For instance, common smoke particles can be about six microns (6 um, or about 240 microinches) in diameter. Consequently, such contaminant particles will commonly "mask", and so obliterate, recorded "bits" (data) if one or several of them sits just above on the overcoat.

So, it has become conventional to specify a thick overcoating layer for defocusing such contaminant particles and all smudges, spots or smears—e.g., here, by providing a transparent overcoating on the order of 100 to 180 micrometers thick. Thus, any dust particles that do settle on the surface of such a protective layer, (and are not wiped-away) will be "defocused"; i.e., thrown out of the focal range of the objective used to detect recorded data and the rest of the optical train—optically they "disappear". As a second purpose, such an overcoat should provide mechanical protection for the recording layer and prevent damage from handling, etc. (e.g. during fabrication, testing or service).

Now, in some cases, workers have suggested relatively "hard" materials as a protective transparent overcoat, while in others they have proposed "softer" materials. For instance, some have suggested an elastomer outer-coat (cf a silicone rubber like "Silastic RTV" by GE—see U.S. Pat. No. 4,101,907, to Bell, et al where an "ablatable" absorber, such as certain organic dyestuffs, was overcoated with a "barrier layer" of $SiO_2$, or of derivatives of sucrose or resin acids; and this supercoated with such a silicone resin). But known overcoatings of soft, resilient (rubbery) materials have characteristically exhibited a "tacky" exposed surface which readily attracts and retains dust; and in certain instances, such "elastomeric" coatings still seem to "constrict" the underlying absorber. Also, elastomers may require a curing temperature that is too high; or, if they cure at room temperature it may take far too long; yet, when heated for "quick curing" they present a serious risk of overheating the tri-layer (—a silicone elastomer like RTV presents all these shortcomings, along with cure-stress, and excessive moisture-uptake in service).

On the other hand, other workers have considered a "hard" outer "sealing" overcoat applied directly over the absorbing layer (e.g., see "Optical Disk Systems Emerge" by Bartolini, et al IEEE Spectrum, August 1978, where, in a "tri-layer" structure, $SiO_2$ is specified above and below a titanium absorber); yet they have been forced to concede that, such a hard overcoat (perhaps because it unyieldingly confines and constricts the absorber) appears to degrade recording sensitivity, to the point where it renders an otherwise acceptable recording medium essentially "unrecordable". Also, hard outer coatings like $SiO_2$ are too absorptive (e.g., of water vapor) to be long-lived.

"Hard/soft" overcoat:

Thus, another aspect of this disclosure is to provide an overcoating which avoids most or all of the foregoing shortcomings, doing so by providing a two-part overcoating made up of a "soft pad" inner layer and a "hard" outer sealing layer—i.e. with a "Hard/Soft" overcoat. The soft inner pad is intended to be yielding and quite compressible (as a "mushy cushion") allowing the subjacent absorber to distort and/or move during write-heating, while also providing good thermal insulation (very low thermal conductivity; relatively low specific heat). In short, this "soft pad" seems to better isolate the absorber, mechanically and thermally; while the "hard" outer coat gives optimal mechanical protection (e.g. a seal against vapor entry). Of course, such layers should also bond well, be highly transparent to the contemplated read/write wavelengths and preferably be convenient and inexpensive to apply.

As mentioned, the mechanical properties of certain such "soft pads" (e.g. of FEP or PTFE, see below) appear to better accommodate motion or deformation of the underlying absorber during "write-heating" (e.g. as a "top pad"; also as a "bottom pad" if the soft material is used as a "spacer" too). Such "soft pads"—evidently because they so decouple the absorber, mechanically and thermally, from its surrounding environment—are found able to markedly increase "sensitivity" (e.g. well over what can be expected using only a "hard" overcoating like fused silica—i.e. the latter will require more energy to "write" a given bit or "hole"). A "soft pad" is so effective as such isolation that even where only used as a subjacent "spacer" (e.g. with $SiO_2$ directly over absorber) it has been seen to enhance sensitivity (e.g., vs. replacing it with an $SiO_2$ spacer).

And, as mentioned below, such a "soft pad" coating is preferably applied as a vacuum-evaporated film with essentially the same facilities as those used to deposit the absorber layer (e.g., during a related, succeeding deposition step, and with common equipment). The consequent convenience and reduced cost, time, etc. will be evident. According to this feature, we have discovered preferred materials satisfying most or all of these rather stringent "soft pad" requirements (including vacuum evaporation) such as the mentioned fluoropolymers (FEP and PTFE). And, advantageously, it is possible to use the same "soft pad" material for both sides of an absorber (i.e., as spacer and overcoat). Alternatively one may choose from a class of plasma polymerized polymers such as a polyethylene or "Parylene" (TM, as para-xylene by Union Carbide, cf U.S. Pat. No. 3,342,754). Preferably, such evaporo-deposition of a "soft pad" layer is applied at the same time, and with the same equipment as that for depositing the absorber layer (and/or the spacer layer).

The thickness of this "soft pad" overcoat is preferably such as to so decouple the absorber layer (thermally and mechanically) from any supercoating (especially a "hard" layer applied over the "soft pad") —and also to bond favorably with the underlying absorber (e.g. so that sensitivity is not badly compromised and so the absorber is suitably "decoupled" from a hard "outer" overcoating, while also preventing the hard overcoating, and/or any stress therefrom, from constraining the absorber and so interfering with pit-formation therein—yet bonded well enough to the "hard" coat to prevent "delamination", moisture intrusion, etc. in service, these easily upsetting the needed optical properties—cf. a mere 100 Å shift can destroy the required "tuning").

It is important to protect the absorber from any such deleterious effects; for instance, especially where one uses absorbers which deform and/or are displaced in the course of recording and creating a "bit-spot". It will be apparent to workers that a hard overcoating (e.g. SiO or $SiO_2$ as known) applied directly on the absorber layer can be expected to constrict it, and restrain such deformation or translation during "bit-writing"—thus interfering with bit formation and degrading sensitivity and recording efficiency, so that more write-energy is needed. Also, most silicon oxides absorb too much moisture. We have experienced these problems using $SiO_2$ (evaporodeposited on a "cool" substrate)—much less so with materials like FEP or PTFE (cf these can be deposited as relatively "non-porous" films under like circumstances).

Thus, workers will see how important and useful a proper "soft pad" of the type described can be, especially where one wants to enhance the recording efficiency of an adjacent OD absorber layer.

Thus, another form of this feature is to so provide a "soft pad" coating over an absorber layer and, where possible to do so using common deposition techniques. A related feature is to provide a like "soft pad" spacer layer beneath the absorber in some instances—whereby one may thermally and mechanically isolate the absorber from interference generated from above and/or below.

A related-feature is to superpose a "hard" protective overcoating outward of this "soft pad", overcoat e.g. to serve as a good vapor barrier, and as a mechanical "cover" and an anti-static surface, as well as to complete the necessary optical thickness for "defocusing" surface contaminants—i.e., a "Hard/Soft" overcoat.

A further improvement on the above is to so apply a (fluoropolymer) "soft pad" which is sufficiently soft and yielding as to mechanically decouple the adjacent absorber layer, freeing it to "move" as written, while also isolating it thermally (i.e. to so function, either as a subjacent "spacer" or as an overlying "soft overcoat" or as both).

A further improvement is to so provide such a "soft pad" spacer using an organic layer which is made strongly adherent to an underlying reflector layer while also being relatively differently adherent to a superposed absorber layer. And a related feature is to provide such a "soft pad" overcoat which bonds to a superposed hard overcoat relatively firmly but bonds differently to a subjacent absorber.

Novel "Hard" supercoat:

As mentioned above, another salient feature hereof is that the above-characterized "soft pad" overcoat is, in turn, preferably super-coated with a compatible "hard" outer protective layer.

And, as a more specific feature, a family of novel "radiation-cured polymers" is here taught for such a "hard", outer coating for an archival OD (optical data) disk; also, a preferred associated novel method is taught for coating such disks with such material.

A novel pre-polymer formulation is described below (e.g. see Mix H-1); it is intended to provide such a "hard" protective overcoating for such OD disks (extended archival life, etc.) and especially as a super-coat over such a "soft pad" overcoat. More particularly, it is intended to provide a "clear" coating (transparent at the contemplated R/W wavelengths), of a thickness to help "defocus" surface dust, etc. (e.g., up to 6-8 mils here) and to provide an environmental barrier against mechanical interference or vapor intrusion (especially water, aqueous aerosols, sulfates or NaCL or other chlorides). It is intended to so function rather like known overcoatings (of a "glass" for instance), and to provide good mechanical protection, (e.g. allowing one to lightly squeeze the disk, though it need not resist a positive cutting action, such as scraping with fingernail—note: without some such a hard super-coating, the soft FEP layer can be wiped-off readily).

Known "hard" overcoatings:

Workers in this art have considered various materials for similar protective coatings. For instance, it has become common to suggest a "glassy" form of overcoat, such as with "fused silica" ($SiO_2$, or SiO) but for present purposes (OD disks, etc.) these seem to be disqualified. For example, they are typically highly porous and can take-up too much moisture; thus they are too prone to swell and crack (especially under the mentioned extreme temperature/humidity cycling tests)—also such moisture contaminants badly degrade optical characteristics. Also, they are not optimal for the desired vacuum-evaporation deposition (e.g. impractical to so deposit several mils or more).

Besides such inorganic overcoatings, workers have considered certain organic materials for providing protective overcoats in similar situations. For instance, as mentioned, some workers have considered using a silicone rubber or like elastomeric polymer for this—e.g., some silastics which may be conveniently curable at room temperature, typically liberate harmful contaminants like acetic acid during cure, (or see "plastic sheet" of U.S. Pat. No. 4,334,233).

In a similar vein, we have considered using a known fluoropolymer, but in the thicknesses contemplated (6 to 8 mils) typical fluoropolymer deposition methods are not favored—e.g. typically require dissipating too much solvent (see problems below with solvent dissipation and associated shrinkage, etc.). More seriously, this could involve a cure-heating which is entirely too intense (at about 390° C.), whereas the subject OD disks and associated coatings are not intended to survive more than about 66° C. (e.g. otherwise their coatings, such as the organic soft FEP overcoat and the absorber layer, would be destroyed, and/or constituents could migrate, etc.). Moreover such polymers are apt to exhibit a "tacky", dust-retaining, surface and are not believed optimally transparent at the subject read/write wavelengths (cf. 600-900 N.meters).

Also considered for such a hard protective overcoat were various "solvent-based" (solvent-applied) polymers. However, drying (curing) these involves dissipating relatively large proportions of solvent, with a great deal of problematical shrinkage likely. This has seemed to disqualify these materials, especially for coatings as thick as those contemplated (also, bubbles, etc. would probably form in such a thick coating of these materials).

Also contemplated were various "two-component curing" polymers such as "RTV-6" (by GE). However, these are somewhat difficult to apply, typically having a relatively high viscosity (possibly requiring problematical heating to soften enough for quick, smooth application); they also typically present "out-gas" problems; further, many cure relatively slowly and at a relatively high temperature (e.g., 15 minutes at about 66° C.—and, even then, the cured material often exhibits a tacky surface and is too apt to scratch, peel-off, etc.). Moreover, such materials typically have too brief a "pot-life" (on the order of one day)—yet another application shortcoming.

Another family of protective materials considered was the PVC type (polyvinyl chloride) but these seemed impractical because of the solvent-application involved; also, and more important, they will typically crystallize over time, giving rise to an unacceptable optical "dichroism". This "dichroism" will interfere with the desired read/write beam transmission (the read/write laser beams are already polarized, etc. and a crystallized overcoat would obviously give optical problems, as workers will recognize). The subject preferred radiation-cured acrylic polymers do not seem to present the foregoing problems, e.g., they do not so crystallize and present no "dichroism" problem.

Preferred materials for "HARD overcoat":

Accordingly, the foregoing families of chemical coatings are disfavored. An attempt was made at using a "radiation-cured" acrylic type polymer (acrylic monomer, or pre-polymer mix with various additives, similar to the "Mixture H-1" discussed below). It was found, somewhat surprisingly, that when properly applied (e.g. see "spiral" technique, below; with appropriate "setting surfactant" and appropriate "solvent-leveling", etc.) such an overcoat could satisfy (most, if not all of) the mentioned requirements, whereas other materials seem less likely able to do so. Thus, it is another object of this disclosure to teach the use of such radiation-cured polymers (especially acrylics) as a "hard" proteqtive overcoat for such optical data disks, as well as teaching related methods of preparing and applying them.

As detailed below, a preferred family of hard coat materials—"radiation-cured polymers"—is made up of a number of "acrylated monomers" (or "pre-polymers", i.e. a ligomer or resin that will undergo further polymerization —especially where the principal constituent is a suitable acrylate or acrylamide). A preferred version (Mix H-1) includes an appropriate acrylated epoxide and acrylated acrylate, together with an acrylate cross-linker and associated acrylate diluent plus photo-initiator, and preferably including a prescribed "setting surfactant". Also, a minor portion (e.g., 10%) of the Mix may comprise one or more additives (preferably organics which will participate in the UV polymerization, e.g. styrene or like vinyl-ethers do this).

Such acrylics are evidently eminently suitable for several reasons: they do not include (any significant portion of) problematic components like "shrink-prone solvents" and they require no problematic cure conditions (such as extreme heat). They seem to be especially apt for providing a final "Hard" polymeric overcoat which has the required characteristics.

And, such "acrylic radiation-cured polymers" will be recognized as satisfying essentially all the other cited requisites of the desired "Hard overcoat"; i.e. they don't readily crystallize, they have no massive solvent content or associated shrinkage problems, they are cured quickly and conveniently and without excessive heating; and they are relatively easy to apply, (e.g., as a low-viscosity monomer solution). They appear quite superior in resisting degradation and attack by common environmental components; they are not "tacky" or dust-retentive, and, unlike the "two-component-cured" polymers, they are compatible with a wide number and variety of additives (e.g. their curing is not affected thereby, as seen in the Examples below).

Workers will recognize that the required cure-radiation may be something as inexpensive, quick and convenient as a few seconds exposure to a UV source (of appropriate $\lambda$, intensity, etc.) and involve as little as 5% shrinkage. Or, where cost is not a major concern, one may instead cure with electron-beam or gamma radiation. Alternatively, a peroxide (catalyst) curing may be feasible in some cases. And, whatever the primary curing mode, it will be understood that light supplemental heat may, in certain cases, be so applied to hasten complete curing.

Application as "spirals":

According to a related feature, such acrylic overcoat polymers are preferably applied in a spiral configuration on a host substrate-disk, being evenly distributed thereon (e.g., with appropriate disk rotation and inclusion of a certain particular fluoropolymer "setting-agent"), and allowed (or in some cases induced) to settle and flow-out evenly. This is seen to spread the mix across this surface with exceptional smoothness and uniform thickness —e.g. giving a thickness variation as little as $\pm 0.7$ to 7.0 micrometers in a 7 mil coating across a disk-band several inches wide (e.g., the outer-half of a 14" disk). This is quite striking. Workers in the art, whether involved with such acrylic coatings or other coatings, will recognize that the simplicity and novel advantages of such a coating technique are quite remarkable.

The related discovery of a particular "setting-agent" (mentioned above) is, surprisingly, seen to not only provide the usual surfactant properties (such as enhancing wetting, leveling, etc.) to a remarkable degree, but also to "set" the mix—i.e. to cause the spiral rows, once applied to the host disk, to "set up" and remain in place until self-leveling (or being contacted with an appropriate leveling-solvent). Such a "setting action" will be seen to enhance the simplicity of the coating technique; for instance, it allows the host disk surface to be slowly rotated in the course of applying these spiral rows without the material deforming or moving asymmetrically under associated centrifugal forces.

One variant of this novel application technique includes a "solvent leveling" step wherein the spiral rows of the mixture so-applied on the disk, may be induced, upon contact by a proper solvent vapor, to "wet" (with the disk surface) and spread themselves across the disk surface with remarkable uniformity and speed. Particular solvents are suggested for this, especially apt for the preferred coating materials and substrate surface.

Thus, it is an object hereof to provide the foregoing, and other related, features and advantages. A more particular object is to do so, teaching the use of "soft pad" materials adjacent an "optical recording layer". Another object is to teach such for improved recording sensitivity, adequate for low-power lasers; as well as for extended service life. A further object is to teach preparation of such "soft pad" layers using fluoropolymer materials, especially as deposited by vacuum evaporation. Another object is to provide such "hard" overcoatings and associated preferred materials and application techniques.

DESCRIPTION OF THE DRAWINGS

These and other features and advantages of the present invention will be appreciated by workers as they become better understood by reference to the following detailed description of the present preferred embodiments, these being considered in conjunction with the accompanying drawings, wherein like reference symbols denote like elements:

FIG. 3 very schematically indicates a preferred method of applying overcoat material according to another feature hereof, while FIG. 6 is a profile of outer-coating thickness variation, while

Exemplary OD recording (FIG. 1; as tri-layer with "overcoat"):

One preferred use of such a "soft pad" is as the "spacer" in the well known "Dark Mirror" (or tuned "tri-layer") configuration adapted for optical recording of digital data as referenced above—this spacer being disposed between an absorber (recording) layer and a reflector layer, of course, (e.g. re such media using "dark mirror" effect, see references elsewhere herein).

Figure 1:
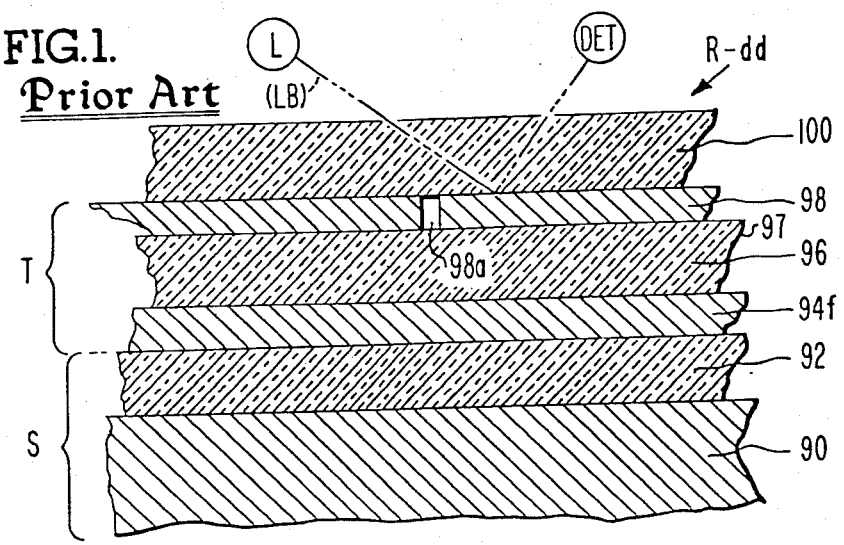
FIG. 1 provides a cross-sectional view of an idealized portion of a prior art recording medium.

Before specifying some Examples of preferred embodiments of such "soft pad" spacers, an exemplary "tri-layer" optical record configuration, shown in FIG. 1, will be described briefly and functionally, as follows:

FIG. 1 will be understood to (schematically and in idealized fashion) depict a fragmentary section of an optical data disk R-dd, including a substrate disk S supporting a recording tri-layer T and overlying protective overcoat 100. Disk R-dd will be understood as intended and adapted for recording by a known radiation source (Laser L) directing a beam LB at tri-layer T so as to record certain bits therein (cf sample "bit-hole" 98-a in absorber layer 98)—these to be "read" using prescribed associated detect means (DET).

The wavelength of the reading laser beam (LB of FIG. 1) is chosen so that unrecorded regions of disk R-dd exhibit the desired anti-reflection condition; read-beam intensity will be kept low enough so as to not disturb the integrity of data recorded on the disk. Substrate S preferably comprises a relatively conventional magnetic recording disk 90 with a smoothing layer 92. applied thereon as necessary. Tri-layer T comprises a transparent spacer layer 96 atop a reflector film 94, with a suitable absorber or recording film 98 superposed on layer 96.

It will thus be understood that the reflected read-beam will be intensity-modulated by optically detectable changes at bit sites where data was recorded, (e.g., at "hole" 98-a). Thus, the read beam will experience relatively high reflection when incident on a "bit" (e.g. "hole" 98-a) and relatively low reflection when incident on unwritten regions. Protective layer 100 is chosen and arranged so that dust particles on its upper surface will be displaced far from the focal plane of the optical system (i.e, placed out of focus); and so have a negligible effect on the recording and reading operations.

It is conventionally assumed that, for the laser beam to "write" (i.e. "record" and produce an optically detectable disturbance in the reflectivity of the thin film absorber layer 98) absorber film 98, at any given bit-site (98-a), must be heated to a prescribed (minimum) write-temperature (Tw). The level of minimum temperature Tw is believed to depend on the properties of absorber 98 (e.g. on its thickness, metallurgy, microscopic structure, etc.) and also on the properties of subjacent spacer 96, as well as upon "interface characteristics" between the spacer 96 and absorber 98, and possibly between overcoat 100 and absorber 98.

It will be found that a finite time is required for writing at a "bit site" (e.g. region 98-a on which the writing laser beam is here assumed to be focused) to reach this requisite minimum "recording temperature" Tw. But while "bit site" 98-a is being so heated, some of the applied heat is typically assumed to be escaping through underlying dielectric spacer 96 (also 100, possibly) and thus "wasted". To the extent such heat is lost, more time/energy are required to "write" of course, i.e.. recording sensitivity is commensurately degraded. It is also believed that such heat-loss can reduce the quality of the recording and thereby reduce "recording density" for a given medium.

Soft pad as "Tri-layer-spacer"; preferred materials:

In accordance with the present invention, it has been discovered that certain "soft pad" (e.g., fluorinated hydrocarbon polymer) materials can be used advantageously as such a dielectric spacer layer 96 (FIG. 1), and, importantly, that use of such a "soft pad spacer" can significantly reduce the waste of write-energy (i.e., less writing-energy lost at the bit site).

One preferred material is PTFE (polytetrafluoroethylene) polymer; another is FEP (fluorinated ethylene propylene) copolymer—both are "fluorinated polymers" commercially available (e.g., under the name "Teflon", a trademark of DuPont). Such a fluorinated polymer can be vaporized and deposited over the reflective layer 94 (FIG. 1) in thin uniform layers; especially, for example, by vacuum evaporation from a suitable melt, as discussed below. Such coating materials are understood to be in the "vacuum-evaporated/deposited" state, since they are believed to be in a "modified" state after such deposition.

SAMPLE O—CONTROL ($SiO_2$ spacer)

Preparation of Tri-layer T; (FIG. 1):

About 600–900 Å of aluminum (prefer about 600 Å, vapor-deposited) is applied as the reflector 94 atop an aluminum disk 90, preferably smoothed properly with a subbing layer 92 as known in the art.

The aluminum 94 may be so evaporated under high vacuum, in a large, batch-coating chamber with corresponding large coating distances and "double-rotation" of substrate, etc., to better ensure uniformity. All dust and stains on parts should be reduced to a strict minimum, using rigorous "Clean Room" techniques.

The spacer 96 is similarly deposited atop reflector 94. Under present practice spacer 96 serves as a dielectric material which is relatively transparent to the "working portion" of the laser spectrum. About 1600 Å of vapor deposited $SiO_2$ (silicon dioxide) would be conventional to use for the subject purposes (e.g., for write/read at $\lambda = 6328$ Å). (Note: from an optical standpoint, a spacer of thickness $t_s = \frac{1}{2} n \lambda_r$, will "disappear").

Absorber layer 98 may be understood to comprise a relatively thin layer of tellurium which is vapor-deposited (thermally evaporated) onto spacer layer 96 (on a relatively flat—~ $\leq 1/20\lambda$—record surface thereof).

Here, a film of tellurium on the order of 50 Angstroms thick will be assumed as the illustrative absorbing layer. Analogous uses of tellurium are presently known in the art (e.g., see above cited references; also see "Optical Properties of Tellurium Films Used for Data Recording" by Ash and Allen, SPIE Proceedings, #222, 1980; and see "Design and production of Tellurium Optical Data Disks" by Rancourt, SPIE Proceedings, #299, 1981).

Tellurium, or some other "absorber metal" having a low melting point and poor conductivity is commonly preferred by workers because it is felt to exhibit superior sensitivity, thus minimizing required (threshold) laser write-power. It is not particularly recommended here because of its poor archivability; but it is very useful for purposes of illustrating the invention because it is so well understood by workers (also because its "deformational" hole-forming mechanism seems well-suited for taking advantage of "soft pad supercoats" as here taught).

For instance, in U.S. Pat. No. 4,222,071 to Bell and Bartolini, similar tellurium recording films were characterized as requiring laser-power on the order of 15+ mW for writing thereon (to achieve adequate read-out, about 20% optical efficiency being assumed—the goal being to permit recovery of recorded video signals with about 40–50 dB S/N, or "broadcast quality"; U.S. Pat. No. 4,222,071 also specifies a like arrangement where a solid state Ga-Al-As injection laser is apparently used to apply a continuous R/W beam about one (1) micron in diameter at the record surface, which is thewhile kept moving; or see video recording materials of U.S. Pat. No. 4,334,299).

Here, test recording is to be performed with a gas (He-Ne) laser beam operating at 6328 Å, with recording exposure from 30–470 n.sec [usually 10 mW, 40 n.sec or about 400 p.J.—this intended to yield minimum adequate read-out, or about 40 dB S/N, when read at lower power e.g. 150–500 pJ/cm², where pJ=$10^{-12}$ watt-sec or Joules), with the same or similar laser equipment. Note: for this contemplated setup, assume the laser beam is focused on bit site of ½ to 1 micron diameter, (i.e. 5000–10,000 Å), with a write-pulse about 40 n.sec long—this also accommodating disk rpm of 1800 and associated galvo-mirror focus characteristics].

The subject record R-dd (FIG. 1) is so-recorded upon. It is found (relating to comparable situations in the literature, etc.) that relatively "moderate-power" laser pulses can heat and ablate the Te film sufficient to yield the well-known "pits" or "craters" and give good read-out (e.g. bit reflectance of ~50% vs. background of 1–3% at λ=6328 Å)—however with quite a bit of "noise" too.

Following are examples of a number of preferred constructions for a multi-layer optical medium using "soft pad" material in accordance with the invention.

SAMPLE I (FEP as spacer)

Sample O, the Control, is duplicated, except as hereafter specified.

Here, the optical data disk is constructed to comprise a polished glass substrate on which is laid an aluminum reflective film about 600 Å thick; then, on the aluminum, an FEP (fluoroethylene-propylene) copolymer as a "soft pad" spacer layer approximately 1100 Å thick, with a tellurium absorber film approximately 66 Å thick laid upon the spacer. The reflector, spacer and absorber layers are deposited, in a single continuous sequence and with a single common apparatus, by vacuum evaporation, as described above and consistent with present good practice.

For the most dramatic demonstration of the thermal effectiveness of a "soft pad" spacer, one should employ an absorber having minimal lateral heat loss. Te is really not optimal, but is suggested here principally because workers are so familiar with it and with its usual performance; of course, Te is not "archival" as here understood, so where extended "record life" is required another absorber will be indicated—and see articles, by Rancourt, by Ash et al. etc. cited elsewhere.

Workers will be familiar with present preferred methods for high-vacuum evaporation, and reconstitution on the Al film, of such thin layers of organic materials like FEP and PTFE (cf cited Rancourt article also re similar deposition). Preferably the material is resistance-wire heated in a "boat" or like vessel in the high-vacuum chamber (e.g., FEP rods may be cut to convenient sizes for placement in the boat; relatively little heat is needed to vaporize the FEP since its boiling point is quite low. Electron gun vaporization is disfavored as it will likely decompose FEP). And in certain instances, a like chlorinated hydrocarbon, such as "Parylene" (Union Carbide, Trade Name), may be substituted.

A "modified" form of FEP will be understood as so-deposited; e.g., when a relatively high molecular wt. fluoropolymer like "Teflon 140" by DuPont is cut from rods into bits and so vacuum evaporated, we conjecture that it deposits, on the Al reflector film as a "different" polymer, probably of lower molecular wt. and characterized by shorter-chains, cross-linked weakly, if at all, (e.g., it is so soft and weakly-bonded, a finger stroke will wipe it off). Presumably, after such heating in the high vacuum the FEP breaks down, then migrates to the relatively cool Al surface when it condenses and re-polymerizes (whereas when so heated in-air, FEP is believed to decompose into perfluoro-propylene and tetrafluoroethylene monomers).

Fluoropolymers like FEP and PTFE are of a generally paraffinic structure, with some or all of the hydrogen replaced by fluorine. Both are sold by DuPont Co. under the trademark "TEFLON". They are highly inert (unaffected by reactive chemicals) and are quite stable chemically and mechanically, under the contemplated extremes of temperature and humidity; they have low dielectric constants and appear to bond satisfactorily.

"FEP copolymer" is made by copolymerizing tetrafluoroethylene and hexafluoropropylene. FEP has a crystalline melting point of 290° C. and its molecular structure consists predominantly of linear chains as:

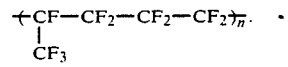

PTFE is a highly crystalline fully-fluorinated polymer made by (free radical initiated) polymerization of tetrafluoroethylene. PTFE polymer has a crystalline melting point of 327° C.; its molecular structure consists predominately of linear chains, as:

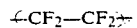

Also, such an Al substrate should be somewhat reactive and can likely promote polymerization and cross-linking (like a "Ziegler catalyst"; e.g. cf. article by M.S. Toy, 34 J. Polym. Sci. 273, 1971), as well as possibly inducing a relatively strong chemical bond either to Al metal or to an Al intermediate.

In such a case, cross-linking of the FEP would be expected to be maximal immediately adjacent the Al film, and to decrease as one proceeded away from the Al up through the FEP-spacer thickness. (This may, or may not, be significant for deriving the desired "absorber isolation", enhanced sensitivity, etc.).

For present purposes, "Sensitivity" will be understood as characterizing the write-energy $E_w$, i.e., the laser beam necessary to change reflectivity (or a like read-out characteristic) sufficient to give the specified minimum read-out.

The intensity and time exposure of the focused Write-Beam here will be understood as sufficient to so elevate the temperature of absorber layer 98 as to cause the indicated change in reflectivity, giving desired read-out quality, etc. (e.g. so that adequate contrast, S/N ratio may be realized, as understood by workers in the art,—cf an exemplary S/N ratio of 40-50 dB (peak-to-peak signal vs. RMS noise) for a bandwidth of about 15 Mhz.

Laser recordings are made on the resulting optical medium at 2400 revolutions per minute using apparatus of the general type referred-to in connection with FIG. 1 (above). A Helium-Neon laser is again used for recording (wavelength of 0.633 um). The focused laser beam "spot" on the medium film 98 is approximately 0.5 um. Resulting sensitivity of such recordings will be found to be quite good—better than conventional approaches, like that of Sample 0, have lead one to expect (e.g., tests indicate that only about one-half the expected write-energy is necessary for acceptable recording; and leakage of write-heat from a bit-site down into the spacer was found to be quite low using FEP—something that is quite desirable, e.g., evidently helping to enhance "sensitivity").

And surprisingly, FEP gives the desired adhesion, bonding rather strongly to the Al reflector film, but differently (evidently) to the overlying (Te) absorber film.

This enhanced sensitivity may also be accounted-for, in part, by the mentioned difference in cross-linking through the FEP thickness and by the same disaffinity of the absorber to bond strongly with FEP. As above-mentioned, cross-linking was found to be at a maximum immediately adjacent the Al layer, while decreasing (lower density) as one proceeds away from the Al, and weakest adjacent the Te absorber. This difference in cross-linking and in bonding is believed helpful toward reducing heat-leakage from the absorber and also to better accommodate deformation or movement of a bit site when the absorber is written-upon; i.e. this "soft pad" spacer yields nicely, adjacent absorber 98-a during writing and evidently presents little or no resistance to the formation of a "hole"—something believed responsible for the enhanced sensitivity this Sample exhibits.

The strong bonding of the FEP to the Al reflector is especially evident after an extended extreme temperature/humidity cycling—this bond survived where other spacer layers have been known to delaminate. Also, no optical "spots" or other aberrations (in Al film) were induced by such temperature/hunidity cycling, whereas such do occur when using silica spacers (which is evidently apt to be too porous, admitting too much moisture, etc., and thus is less "archival").

Moreover, the FEP gives a nice optically-clear layer with a relatively low refractive index (about 1.3 vs. about 1.5 for fused silica, a value somewhat higher than optimum).

Alternative deposition by plasma polymerization or other techniques will be feasible in certain instances, as workers will appreciate.

Also, workers will contemplate that other like "soft pad" polymers may be similarly deposited by vacuum evaporation, although the choice will be somewhat limited in view of the subject, rather stringent requirements. The preferred materials and thickness have been found to be quite versatile; for instance, in many cases one may use a different absorber metal without changing the materials or thickness of this spacer (or of the "soft pad" overcoat, as described below).

SAMPLE II ($SiO_2$ overcoat on absorber)

The construction of the disk of Sample I is duplicated, except that the absorber layer is coated with a protective layer of fused silica ($SiO_2$) about 2000 Å thick.

Results:

Similar to Sample I except that sensitivity, while satisfactory, is degraded somewhat. Also, as workers know the $SiO_2$ is prone to moisture up-take and associated problematical swelling and degraded optical quality.

It is instructive to compare this Sample (II) with Sample 0 ($SiO_2$ spacer) as modified (as Sample II-A herewith) to include the 2000 Å $SiO_2$ overcoat of Sample II. (Thus, sandwiching the absorber between $SiO_2$ layers)

Where Sample II yielded "low, but passable" read-out, Sample II-A (i.e. Sample 0, as so-overcoated) gave no satisfactory read-out. This is a striking difference in sensitivity—something not fully appreciated heretofore, and evidently due to the improved heat conservation and mechanical compliance of the "soft pad" spacer.

A similar, (though slightly different) improvement is seen when such a "soft pad" is placed above, rather than below, such an absorber layer—e.g. superposing a "Hard/soft" overcoat like that of Example A below atop the absorber of this Sample II-A (replacing the $SiO_2$ overcoat, with a "Hard/soft" overcoat). Thus, one concludes that such a "soft pad" placed adjacent such absorbers (above and/or below) will enhance sensitivity, especially where the "soft pad" replaces a conventional relatively rigid film like $SiO_2$.

"Soft pad" as supercoating on absorber:

As mentioned, it also occurred that such a "soft pad" layer might also be advantageous as a "buffer" supercoat over an absorber layer, e.g. helping to further isolate it thermally and mechanically—especially where a like "soft pad" was present underneath the absorber. For instance, it was projected that this might further help in conserving write-energy, while giving a "bit hole" more freedom to move or deform while being write-heated (e.g. vs. a silica supercoat which is believed to seriously constrict hole-formation). On both counts sensitivity should be enhanced.

Such was found to be the case as Sample III will indicate.

In the course of discovering that "soft pad" layers of the type described may be advantageously employed as a buffer supercoat over such absorbers (e.g., over a Te film as described)—especially where this "soft pad" supercoat is, in turn, overcoated with a "Hard" barrier layer—we determined that such a "soft pad" supercoat should preferably exhibit the following characteristics (Table I):

TABLE 1

("Soft Pad" Supercoat desiderata)

1. Optically compatible: good transparency at (R/W)λ
2. Good uniform thickness and surface flatness:
3. "Moderate-to-weak" adhesion to absorber:
   Little or no resistance to "hole writing" and associated deformation and/or movement of absorber - yet no orange peel, lifting, etc.
4. Strong bond to ("Hard") overcoat:
5. Stable under contemplated environment: (i.e. despite varying temperature and humidity, contaminants, etc.):

TABLE 1-continued
("Soft Pad" Supercoat desiderata)

e.g. surviving service temperature without degrading, even adjacent the hole-formation site; chemically stable too; e.g. no release of solvent or other contaminants during cure or under extended extreme temperature and humidity cycling.
6. Softness and compressibility: allowing movement/deformation as in #3; and thick enough to accommodate bit-writing with minimal degradation of sensitivity from overcoating(s).
7. Good thermal insulator: e.g. low thermal diffusivity, low specific heat; survives temperature of fabrication, and of "writing".

Now, others have suggested some kind of polymeric supercoating for such absorbers. For instance, U.S. Pat. No. 4,101,907 mentions "silicone resins" for such (e.g. General Electric's RTV 615 or RTV 602, these curing at room temperature with certain curing agents; or Dow Corning's Sylgard 184—e.g. suggesting these for use over titanium)—preferably with an intervening "barrier layer" of $SiO_2$ or certain complex organic materials.

SAMPLE III (FEP on absorber)

The disk of Sample II is duplicated, except that the absorber film is covered with a layer of FEP (like the spacer layer, and likewise deposited), about 9500 Å thick (no $SiO_2$ supercoat).
Results
Similar to Sample I, except that a bit more write-energy is required—much less, however, than with Sample II ($SiO_2$ on absorber).

SAMPLE IV

The disk of Sample III is duplicated, except that the substrate disk is a standard aluminum "Winchester" disk (as used in commercial magnetic recording disks for computer media).
Results:
Essentially similar to Sample III.
Alternative "soft pad" embodiments:
Workers will recognize that such a "soft pad spacer" may be otherwise implemented in appropriate instances (e.g. with another "soft" relatively non-reactive, stable, durable, imperfectly cured, or weakly polymerized and lightly cross-linked, polymer, such as modified polytetrafluorethylene, a chloro-fluoro polymer, which will typically decompose and repolymerize in similar fashion or other like modified fluoropolymers). Likewise for such a "soft pad supercoat". And, other deposition techniques will, in appropriate cases, be feasible, such as with a plasma deposition technique like glow-discharge (especially for fluoro-carbons) or sputtering, especially where chemical breakdown is not complete. And workers may well change the optical absorber; e.g., to another more compatible, high-sensitivity, thin-film, low thermal conductivity material which also couples properly to the soft pad. Further, workers will contemplate other like applications where such a "soft pad" layer will be advantageous; e.g. as an "isolation layer" above and/or below other like recording films; or as a soft, compressible intermediate between a record layer like the Te film and a relatively "hard" coating like the below-described "Hard Overcoat", especially where this "soft pad" adheres well to the hard overcoat and properly couples to the record layer. Workers will see like applications with ODD record-layers in monolayer or bi-layer form too.

Preferred overcoat embodiment; Ex. A, FIG. 2 ("Hard/Soft" overcoat O-C):
Disk $R_D$ in FIG. 2 (only small schematic section shown; and along the lines of FIG. 1, being essentially the same except as otherwise specified) illustrates a preferred example of the features mentioned above, and especially the (general) teaching of a "Hard" overcoat applied over a "soft pad" layer covering an absorber recording film—i.e. a novel "Hard/Soft" overcoating structure O-C (cf FIG. 1, Hard coat g and soft pad layer f over absorber e, which is part of the same sort of ODD "tri-layer" T-L as before, applied on substrate S'). It will now be described with reference to this schematic showing.

Except as otherwise specified, workers will understand that (here and for all embodiments) all materials, methods and devices and apparatus herein will be understood as implemented as above or by other known expedients according to present good practice. In the course of this description some variations which could prove useful in certain circumstances will also be pointed out.

Subtrate:
The substrate portion may be thought of as the aluminum substrate disk A, treated, when necessary, with a smoothing or subbing layer B to make its surface sufficiently smooth. Thus, substrate A is preferably a common "Winchester" disk, of an aluminum alloy and prepared as is typical for fabricating disks for high speed magnetic recording of digital data (e.g., as used in computer memory systems). The surface of such disks is commonly polished, diamond-turned or otherwise smoothed, as workers well know. Alternatively, a suitable glass or plastic disk may be substituted in certain instances.

"Subbing" layer B will be understood as applied to the bare, well-cleaned disk surface. The "subbing" preferably comprises an organic material to so smooth the microscopic irregularities on the surface of substrate a to well under "hole size" (e.g., about 0.5 um or less in diameter). If the surface is already smooth enough (e.g. if a highly polished glass disk is used), a subbing layer may not be necessary, as workers know.

This substrate is thus understood as preferably comprising a 14" disk to be operated at about 1800 (to several thousand) rpm, with good surface smoothness.

A radiation (laser) beam of prescribed energy and wavelength will be understood as applied to medium $R_D$ from a laser source L (see FIG. 1), being activated and focused at "write time" so as to render a "pit", "hole" or like optical "anomaly" apt for the contemplated read-out on recording layer e in the course of "writing" (e.g. analogous to site 98-a in FIG. 1). More particularly, one may, for example, contemplate using a 10 mW gaussian beam with diameter of 0.8 um (i.e. 8000 Å) and scanning at 45 m/sec. to form an optical transition with a certain minimum length and width, e.g. 0.8 $um^2$, though not necessarily square, circular or other prescribed shape. Now, this requirement is too stringent for conventional means, as workers realize (e.g. for archival records).

So, where each "pit" (bit) is recorded, the "antireflective" background will be disrupted such as to yield "bit marks" adapted for high-contrast read-back. And, where the recording wavelength is shifted, the spacer thickness is readily altered to give like results. In this "tuned" ("tri-layer" or "Dark Mirror") configuration, surface reflectance (on absorber e) can be made "zero", or other selected value, by adjusting absorber thickness and spacer thickness. (A "tri-layer" being here understood as comprising a transparent spacer with absorber on one face and reflector on the other, thicknesses being adjusted for "optical tuning" as workers will know).

Thus, the coating parameters here will be understood as selected to preferably provide an "anti-reflective" condition for the so-coated disk at the contemplated recording frequency when the write beam is focused on this absorber layer. (Regarding such see above, and also: "*Anti-Reflection Structures for Optical Recording*" by Bell and Spong, Journal of Quantum Electronics, vol. QE 14, No. 7, July 1978; and, for general prior art, see exemplary articles: "Optical Disk Systems Emerge", IEEE Spectrum by Bartolini, et al, August 1978, page 20; and "Optical Storage Materials and Methods", SPIE Proceedings, Vol. 177, Optical Information Storage, 1979, page 56).

Recording Portion ("Dark Mirror" type):

The recording face of disk $R_D$ may be visualized as an "absorber layer" (e) together with an appropriate subjacent "spacer layer" (d) and a "reflector layer" (c), below spacer d, as well known in the art. As another aspect of this disclosure, such layers (c, d and e) are preferably applied by successive evaporative coating sequences with appropriate materials in a single high-vacuum chamber, and preferably together with "soft pad" overcoating (f) also as described below.

Alternatively, these applications might be rendered by a suitable plasma polymerization technique or other appropriate methods for producing films of the mentioned type. Workers will recognize, as a feature of advantage here, the teaching of materials and techniques which may accommodate such a series of like deposition steps using a common deposition apparatus, (e.g. especially where spacer layer d and a soft overcoating f both comprise like "soft pads").

Reflector layer c comprises, preferably, a layer of high reflectivity metal such as vapor-deposited aluminum as above discussed; e.g., deposited until layer c is "just opaque" under the contemplated illumination, as viewed through layer c (as workers knowledgable about making evaporated reflectors well know, too thick a reflector will degrade reflectivity). And as workers know, other metals can be used so long as they provide sufficient high reflectance at the contemplated R/W wavelengths—however, unless great care is taken, a substitute reflector metal may not yield the reactivity and bonding synergism that Al seems to exhibit with FEP (and equivalent spacer material). Another option is to use dielectric films of alternating high and low index and with a quarter-wave reflector.

Spacer layer d, is intended to function, in combination with the reflector layer c and absorber layer e, to reduce the reflectance of the "tri-layer" assembly to zero, or to some other predetermined reflectance value. The materials used will preferably be relatively "non-absorbing" and highly transparent to the contemplated R/W wavelengths. The thickness of spacer d will depend on its optical properties and those of the other layers in this tri-layer. Preferably a thickness of 0.5 to 1.5 quarter waves will be used. Alternatively, multiple half-wave thicknesses can be added as workers will see. (Note: from an optical standpoint, a spacer of thickness $t_s = \frac{1}{2} n \lambda r$, will "disappear").

A feature hereof (mentioned above) is that the subject spacer material preferably comprises FEP, PTFE or a like fluoropolymer—preferably as vapor-deposited, as above described; e.g., in a common vacuum apparatus, along with layers c and e (and possibly with layer f, as well).

Layer e (FIG. 2, still) is the absorbing film in which the working incident "write energy" is to be concentrated. The absorber of Sample I will be assumed.

Overcoat portion:

"Soft pad" coating f preferably consists of a convenient thickness (e.g., a few thousand Å) of FEP or a like polymer (e.g. preferably and conveniently be the same material and deposition method as for spacer layer d), Iti is preferably formulated and deposited (on absorber e) as the FEP coatings described above, most preferably being laid-down in the same overall deposition sequence; cf with tri-layer T-L for convenience.

Where using the "tri-layer", it will be convenient to detect and control thickness with layer f being deposited as one or more half-waves. As workers will realize, a number of half-wave thicknesses will make the soft overcoating "disappear" optically, and thus not reflect read/write energy meant for the absorber layer (—this would reduce system efficiency).

"Soft pad" supercoating f will be sufficiently yielding and compressible to maximize sensitivity, will be relatively non-porous, thermally insulative, with a relatively low specific heat, as well as being highly transparent to the contemplated R/W wavelengths (λr) as mentioned above. Also, it will bond firmly to a superposed barrier layer, but couple rather loosely to the underlying absorber (e.g. which preferably will be relatively non-reactive with the "pad")—also a flash intercoatings can, of course, be used. It should also be chemically stable, compatible (not project contaminants in record $R_D$) and able to be matched thermally and mechanically to adjacent layers (i.e., to absorber e and hard coat g). Ideally it will also be cost-effective and convenient to apply (e.g., with same deposition methods and equipment as layers c,d,e).

FEP and PTFE as above-described (being vacuum-evaporated, etc.) will be found to meet most, if not all, these stringent requirements (as summarized in Table I above), though other like materials (e.g. like "weakly-polymerized" fluoropolymers) will be suitable in appropriate instances. And, when such "soft pads" sandwich an absorber on both sides, the "thermal-mechanical isolation" thus afforded will be recognized as exceptional.

Further treatment of "soft pad" overcoating f may be necessary to optimize its compatibility and bonding to contiguous coatings (e.g., to enhance its adhesion to the "hard" overcoating and/or to weaken its bond with the underlying absorber layer). For instance, it has been found that a few atomic layers of silicon dioxide ($SiO_2$), or of $Al_2O_3$, vacuum-evaporated onto the surface of a soft FEP supercoat, is often preferable for enhancing the wetting, etc. of a hard overcoating g like the radiation-cured acrylics described below. As a feature hereof, such "soft pad" supercoatings will be seen to give strong adhesion to a hard supercoat thereon, but be coupled relatively loosely to the underlying absorber layer.

The rest of the overcoating O—C on absorber e (i.e. the outer portion) is made up—according to a related feature hereof—of "Hard" overcoating layer g, preferably of the below-specified acrylics. This serves not only to provide outer mechanical protection and the needed defocusing thickness (with pad f), but also serves as a good vapor barrier and anti-static surface. The preferred formulations for hard overcoat g and related preferred methods for preparing and applying such are detailed below.

The thickness of layer g will, to some extent, depend on the optical system used (e.g., correcting spherical aberration in the focusing objective may be involved); it has been found that thicknesses on the order of 100–180 micrometers are quite suitable for this embodiment.

Results: (Ex. A, FIG. 2):

The "hard/soft" overcoat embodiment suggested above (e.g. particularly with an acrylic as in Ex. I below, applied on "soft pad" as in Sample I above, with underlying absorber, tri-layer, etc. as in FIG. 2) will be seen to give surprisingly good sensitivity (e.g. superior to analogous records where a thick $SiO_2$ overcoat overlays the abscrber), as well as providing the other desired characteristics mentioned above (e.g., Table I).

Of course, workers will understand that this embodiment (Ex. A) is rather generally described, with further particulars of materials, deposition, etc. of the "Hard" and "Soft pad" coatings given elsewhere herein (cf. "Hard" Ex. I, etc., "soft pad" Samples I, II, etc.).

That is, the "soft pad" overcoat generally described above is specified in some Examples elsewhere (e.g. see Samples I, II, etc. as to structure, materials, preparation, use, with certain results and advantageous characteristics indicated). For instance, such a "soft pad" (of FEP or PTFE) will be seen as superior to such common coatings as fused silica (e.g. reducing required write-energy, giving longer; better environmental stability and service—especially in respect of moisture uptake—e.g., when combined with a suitable "Hard" overcoating).

The "Hard" overcoat resulting will exhibit the usual properties expected of such a protective outercoat (e.g., hardness, abrasion resistance, non-tacky), be readily cleaned (e.g., of dust, oil, fingerprints), be clear and transparent to $\lambda_r$ and exhibit low permeability to contaminants like water vapor, oxygen, etc. Also, it bonds satisfactorily to the "soft pad".

Such a Hard coat material is applied by spin-coating (according to present good practice) or by other suitable techniques known to workers (e.g. in certain instances, spray-coating, dip coating, flow-coating or curtain coating may be feasible alternatives). Radiation-cured acrylic coatings like those detailed below will be understood as apt for most instances.

Other materials for Hard/soft overcoating:

Workers will understand that, in appropriate instances, other "soft pad" and/or "hard overcoat" materials may be used to effect some or all of the indicated functionality of the preferred embodiments here detailed. For instance, in certain instances the hard overcoat may take the form of a transparent sheet; e.g. or quartz, or a similar glassy material, laminated onto the "soft pad" or vice versa—in some instances the "soft pad" may also serve as the adhesive for the Hard coat.

Figure 2:
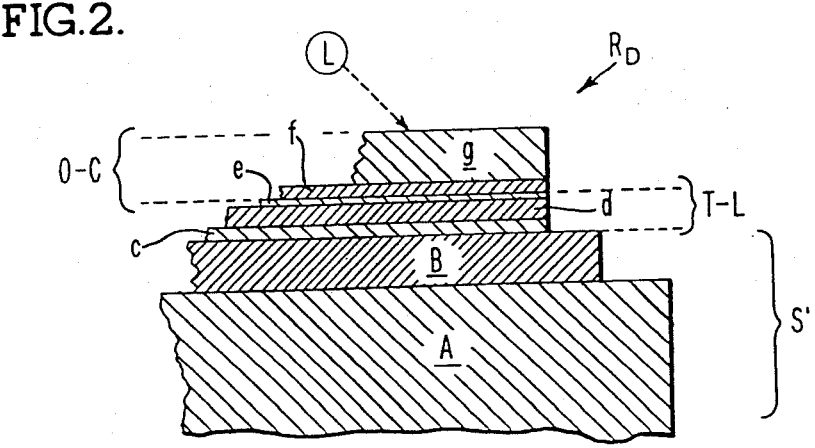
FIG. 2 provides a similar view of a novel preferred recording medium embodiment exhibiting a construction in accordance with features of the present invention.

Preferred "Hard overcoat" materials:

Expanding on the foregoing, we will next describe a family of materials especially, and surprisingly, apt for use in protective "Hard" overcoatings like those above discussed (e.g. as a supercoating over a "soft pad" on the OD disk of FIGS. 1, 2, etc.). Thereafter, we will describe a preferred novel associated technique for applying such "hard coating" material to an OD disk or like substrate.

EXAMPLE I ("Hard" coating on Sample IV; Preparation, application, curing)

This Example is intended to describe the preparation and characteristics of a preferred radiation-cured acrylic hard coating mixture "H-1" as applied to the Sample IV embodiment (on FEP "soft-pad" supercoat over absorber) and also to describe a general method of applying this to a substrate and then curing it in situ; later, further details of a particular preferred method for applying this to a prescribed optical data disk will be described (see description in connection with FIGS. 3 and 4).

Working at room temperature and otherwise standard conditions, the following "Hard overcoat" prepolymer mixture H-1 is prepared, being intended for application as a "Hard" protective overcoating, about 7 mils thick, and having the described characteristics as uniformly spread and cured on a prescribed optical data disk surface. This surface may be understood as comprising a properly-treated aluminum disk substrate (e.g., with smoothing pre-coat thereon) with a tri-layer optical recording matrix superposed thereon, followed by a vacuum-evaporated thin, "soft pad" supercoating (of FEP or a like "soft pad" fluoropolymer, evaporated, deposited and repolymerized and about 9500 Å thick). Such a "modified FEP polymer" is, thus, the substrate of choice here.

| Mix H-1 | Parts, by wt. | Pref. Range |
| --- | --- | --- |
| Celrad 1700 (Celanese Corp) | 120 | 105 to 135 |
| Celrad 3200 (Celanese Corp) | 40 | 35 to 45 |
| TMPTA | 160 | 145 to 175 |
| 2-ethylhexyl acrylate (2-EhA | 180 | 160 to 200 |
| "FC-430"(3M Co.) | 2.5 | 2.5 |
| Darocure 1173 (E.M. Chemicals) | 5 | 5 |
| Total | 507.5 | 453–563 |

The Celrad 1700 will be understood to be an acrylated acrylate of relatively high molecular weight and readily cured by ultraviolet light (as below) when properly initiated. This basic pre-polymer entity is selected to impart the desired toughness, strength and chemical stability to the cured coating over relatively extended service life; and because it very quickly and conveniently cures and yields good clarity; also, like all the other constituents it is preferred here because it is generally low-cost, easy to formulate and apply, and because it yields the desired "archival" protective coating (as mentioned elsewhere).

The Celrad 3200 is an acrylated epoxide of relatively low molecular weight (1000–2000 m.w.) adapted to lower viscosity to a convenient level where the coating will flow onto a substrate; and it will augment scratch-resistance, bulk strength and other protective properties; and it particularly enhances moisture resistance (otherwise under the preferred "Humidity Test" conditions, the polymerized coating would likely take up too much moisture, then swell and crack).

Without such a "low-m.w." diluent (and the other low viscosity additives), this formulation would be too thick and viscous to apply (see preferred spiral application technique below—e.g., mix must flow through a dispensing nozzle). Also, the cured coating would likely tend to swell and crack. And, the "3200" is relatively inexpensive, compatible with the other ingredients and is believed to participate in the desired polymerization.

However, since 3200 can tend to discolor slightly over time and since it can exhibit a slight "gel" content (problematical if not filtered-out), its concentration should normally be minimized to the extent feasible.

Workers will recognize that other like, low-viscosity co-monomers (or pre-polymer, low-viscosity diluents) may be substituted, adjusting viscosity accordingly. For instance, other Celrad formulations are lower in molecular weight and and could be substituted for the Celrad 1700 to drop viscosity even lower. However, other common coating polymers are not feasible; for instance certain silicone resins raise solubility and curing problems.

The trimethyl-ol propane triacrylate (TMPTA) is a "low m.w." cross-linking agent apt for use in this mixture. Other like cross-linking agents might be substituted, such as trimethyl-ol trimethacrylate. Some such cross-linker will usually be used,—to enhance coating strength, etc., as workers well know—preferably another "low m.w." cross-linker.

Elimination of TMPTA or the Celrad (without replacing by equivalents) will tend to drop viscosity too much, soften the cured overcoat and allow moisture-intrusion and swell-cracking thereof (e.g., see H-2 below).

The 2-ethylhexyl acrylate (2-EhA) is an organic diluent, supplemental to the "3200"; it is added, here, to improve flexibility (e.g., scratch-resistance) of the final polymer coat and also to adjust (lower) viscosity. Workers will recognize that other such diluents may be substituted such as iso-decyl acrylate (though hardness, toughness and strength will suffer a bit).

The "Darocure 1173" is a photo-initiator apt for such (UV) curing of such a mixture. Workers may substitute one of many like initiators such as Irgacure-#184 or Irgacure #651 by Ciba Geigy Corp.

The "FC-430" is a fluoropolymer "surfactant" additive characterized as a "non-ionic surfactant" for organic polymeric coating systems and also exhibiting the mentioned "setting" functionality. It is known to help with wetting, leveling, spreading functions and as a flow control agent, being adapted for reducing surface tension of certain coatings on certain substrates. It is promoted as being very non-reactive and as compatible with water-based or solvent-based systems (and with most polymers). "FC-430" might, with certain adjustments, be replaced by a like surfactant "FC-431" (also by 3M Co.—is diluted 50% by isopropanol and ethyl acetate; it has a higher molecular wt. and is not preferred here).

And FC-430 may also be replaced by other such surfactants which also give the described "setting" action (for an acrylic mix like H-1 on a substrate like "modified FEP").

As mentioned below, it was somewhat surprising to find, in the course of applying the monomeric mixture in spiral loops to the OD disk surface (see spiral beads b on disk CD in FIG. 3 and related description below), to find that the "beads" "set-up" so readily—i.e., they held their place and symmetrical shape with relatively little spreading (until later; e.g. when the solvent step is invoked—alternatively, spreading will begin immediately if the beads are placed in contact, as in Ex. M-2 below; in such a case some or all of the FC-430 might be dispensed-with, though it should be harder to "keep a border" near disk-center). The FC-430 appears to enhance this "setting" action—a function for which it was not heretofore known.

Figure 3:
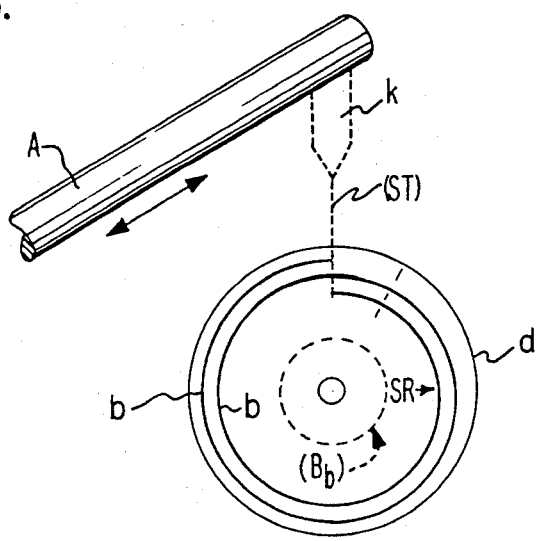
Figure 4:
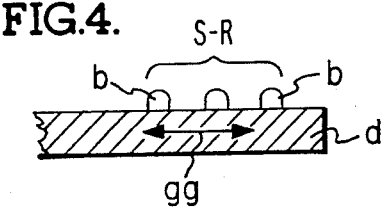
FIG. 4 shows a very idealized sectional view of material so applied.

The FC-430 is intended to enhance this "setting action" in cases of the type illustrated in FIGS. 3 and 4, where, in the course of distributing the monomeric mix on the disk, one rotates the disk—because the so-applied "beads" must resist centrifugal rotational forces lest they be shifted asymmetrically; something that can cause an uneven coating, as workers will understand.

Of course, with other coating methods the FC-430 additive might not be critical and might be omitted (e.g., one might employ a different "non-setting" surfactant); for instance if the substrate disk were not kept rotating during mix application (—e.g., the mixture might be made "self-leveling"—see below).

Most, if not all, common related surfactants will be unsuitable. For instance, "Silicone fluid F-815" (by SWS Silicones Corp.) is a common silicone surfactant, widely used in coatings to promote smoothness and uniformity; yet it caused the spiral beads (of Mix H-1) to flow-together prematurely (insufficient "setting" action; resulting in "rings" or radially asymmetric thickness). Ehecryl-350 (Virginia Chemical Co.) was similarly unsatisfactory.

The Mixture H-1 is, in any case, "viscosity-adjusted" to optimize spreading and disk-application; here, final viscosity should be in the 100 to 150 cp range, given the subject ambient conditions (room temperature, FEP substrate surface, etc.).

As suggested below, a formulation like H-1 (and similar mixtures) is quite tolerant of any number of other additives of widely varying chemistry; so, where appropriate, these may be added.

Curing:

With the material spread evenly across the subject disk (FEP) surface (cf Sample IV—e.g. via spiral techniques described below) and essentially all oxygen driven-off (e.g., by $N_2$ or like inert pre-flush, etc., as detailed below), the coating is photo-cured by exposure to ultraviolet light for a few minutes while the disk is slowly rotated. This renders a good fully-cured "hard" overcoating (no supplemental heat needed, no aging time necessary for complete polymerization).

More particularly, and preferably, a nitrogen pre-flush is invoked (e.g., for about 30 sec. to drive off all oxygen); then exposure, under nitrogen, to UV for about one to three minutes, or sufficient to cure the coating as desired. Preferably, this is done while slowly rotating the disk (e.g. ½ to 2 rpm—while exposing about a 40° to 80° sector to the UV at any one time; note: the preferred UV beam is passed through two heat filters; it is not monochromatic, but fall mostly in λ0.3 to 0.4 μm. range, with intensity varying with λ—e.g. 100 mW/cm² for ½ to 5 minutes at 0.366 μm. —longer if less initiator is used; curiously, such a brief relatively high-intensity exposure seems preferable to longer equivalent low-intensity exposure, evidently because it counteracts "oxygen-quench").

Process Optimization:

1. Small air bubbles may cause "pinholes" or like scattering sites to appear; vacuum degassing of the solution and careful handling afterwards eliminates this.

2. "Orange peel" texturing of the coating may occur. It is eliminated by driving off oxygen in the cure atmosphere —e.g., cure done with nitrogen pre-flush for 30 sec. or so, and during the cure cycle. This also shortens cure time significantly.

Workers will recognize that other related techniques and/or materials and associated adjustments may be substituted in appropriate cases, taking care to assure adequate stability (over extended archival life) and to avoid inducing stress cracks or decomposition of materials (e.g., volatilizing due to thermal effects or because of inadequate curing).

Radiation-curing is preferred over other (superficially-related) methods. For instance, "peroxide curing" is unduly complex and hard to control, and it exhibits short "pot life" (further, workers will recognize that the peroxide cure reaction is exothermic and "gassy", and subject to overheating, making it difficult to control and dangerous to handle—e.g., for good control of the peroxide cure, temperatures should be kept low, thus undesirably extending cure-time; also since gases are evolved, if the cure proceeds too quickly, these gases can't adequately escape and be dissipated, but will induce an undesirable cloudy, semi-opaque light-scattering coating).

Results:

Mixture H-1, when so applied on a disk (FEP surface) and so cured, will be seen to provide a hard clear protective coating, essentially satisfying all of the mentioned subject requirements; e.g. resisting moisture intrusion (and associated swell-cracking), with fine optical clarity and exhibiting good scratch resistance, while being easily cleaned (e.g., by a simple soapy wash at room temperature).

Moisture resistance was particularly surprising and impressive—e.g., though not 100% impermeable, this hard coat will exhibit no swell-cracking even after extended immersion in water (14 days in one test). Similarly, the hard overcoat has been observed to withstand extended extreme temp./humidity cycling (e.g. from room temperature to 140° C. and from about 40% humidity up to 80% humidity, for many weeks).

Further, this Hard outer-coating will be observed to exhibit extended stability—e.g. withstanding extended exposure to a rather extreme temperature/humidity cycling; also, the Hard coating appears free of "low molecular weight components", (like the surfactant or the photosensitizer or their by-products) apt to migrate and attack any other ODD layers. This "stability" and associated toughness, etc., is believed to derive from the relatively cross-linked, long-chain polymer groups produced.

Also, this hard coat adheres (satisfactorily) to the FEP "soft pad", as is desired. Such adhesion might not result where the hard coat and/or the "soft pad" were changed—in such a case, an intermediate compatible (e.g. fully transparent) "adhesive inter-layer" might be called-for; however it is disfavored (e.g. it complicates thickness control).

Photo-initiator concentration seems important. It has been observed that an excessive concentration of initiator can cause premature curing of upper surface portions of the coating (prior to the lower portions curing-)—resulting in large "wrinkles" on the cured overcoat (evidently because the upper surface cured first, shrunk, then slid along the lower, relatively uncured and somewhat fluid, portion).

Also, it is important to control viscosity and leveling characteristics (e.g., keep viscosity of Mix H-1 low enough to level; yet high enough to set-up). It will be recognized that controlling viscosity of the acrylic pre-polymer (Mix H-1) is one key toward good "leveling" of coatings so-applied. For instance, if viscosity is too high the coating beads will "flow" too readily and not properly "set up"; if it is too low, they level too slowly or incompletely. Balancing final viscosity (i.e., after any vaporization) and ease of dispensing/leveling vs. coating-strength and other properties is difficult, but important (e.g., some organic diluents will yield a "short-chain" polymer that will be too "soft").

Workers in this, and related, coating arts, and those concerned with formulating and using such acrylic materials, will be surprised at the uniformity of such a relatively thick coating, one so "rather crudely" spread over so large an area (that is, to so control a 7 mil, or 180 $\mu$m. coating to the order of $\pm 0.7$ to 7 $\mu$m. across a 3" to 4" coating-span [e.g. cf. 4" band $B_b$ in FIG. 3, extending from the periphery of 14" disk d to the 6" radial point], is quite remarkable).

Now, workers have been known to formulate acrylic and other like coatings for certain rather unrelated applications such as in the automobile industry as a base for metal overcoating or in the photo-resist art. However, these other applications have involved relatively "high-viscosity materials", typically sprayed-on with nozzles in rather crude fashion and at somewhat lesser thicknesses, with nothing like the instant precise control of thickness (whereas for like coating in the automobile industry, only a smooth visual appearance is required; here, the laser-detected defraction-limited optical quality is infinitely more precise in smoothness and uniformity).

EXAMPLE II

Ex. I is repeated, except that proportions are modified as below (Mix-H-1A); otherwise it is similarly formulated, applied and cured.

| Mix H-1A | Parts by Wt. | vs. H-1 |
|---|---|---|
| Celrad 1700 | 80 | 120 |
| Celrad 3200 | 80 | 40 |
| TMPTA | 160 | same |
| 2-EhA | 180 | " |
| FC-430 | 2.5 | " |
| Darocure 1173 | 5 | " |
| Total | 507.5 | " |

Results:

As in Ex I, except that viscosity is lower (cf. relatively more 3200 is used here, less 1700); so the mix flows and spreads more readily.

EXAMPLE III

Example I is replicated except that a variant mix "H-2" is formulated as indicated below, being otherwise similarly formulated, applied and cured.

| Mix H-2 | Parts by Wt. | Compare H-1 |
|---|---|---|
| Celrad 1700 | 120 | 120 |
| (Celrad 3200 . . . elim.) | 0 | 40 |
| (TMPTA . . . elim.) | 0 | 160 |
| 2-ethylhexyl acrylate (2-EhA) | 185 | 180 |
| "FC-430" | 2.5 | 2.5 |
| Darocure 1173 | 5 | 5 |
| Total | 312.5 | 507.5 |

Results:

The results were essentially like those in Example I, except that the overcoat was a lot "softer" and more prone to moisture intrusion and "swell-craking".

EXAMPLE IV

Another alternative Mix, H-3, is formulated, applied and cured as with H-1, except that iso-decyl acrylate replaces 2-EhA:

| Mix H-3 | Parts, by Wt. |
|---|---|
| Celrad 1700 | 120 |
| Celrad 3200 | 40 |
| TMPTA | 160 |
| Iso-decyl acrylate | 180 |
| "FC-430" | 2.5 |
| Darocure 1173 | 5 |
| Total | 507.5 |

Results:

Essentially as with H-1, except for improved scratch resistance (surface hardness); but with some swell-cracking.

Disfavored formulations:

Somewhat surprisingly, certain similar "radiation-cured acrylic" mixtures do not seem practical and are disfavored for the instant purposes. For instance, a formulation like Mix $\overline{H}$-4 below will not be sufficiently clear and transparent (at the contemplated 0.4–0.8 $\mu$m. wavelengths), but is apt to fog and discolor, especially after photo-curing.

Mix $\overline{H}$-4:

Mix H-1 is replicated, except that "stearyl methacrylate" replaces the 2-EhA "flexibility-promoter".

Results:

Some "fogginess", etc. is apparent (as noted above—evidently due to phase separation); the coating is not sufficiently clear and transparent.

Mix $\overline{H}$-5:

Mix H-1 is replicated, except that methyl methacrylate (MMA) replaces the 2-EhA.

Results:

Spiral application very unsatisfactory (evidently viscosity too low), also clarity impaired and excessive cure-shrinkage.

Mix $\overline{H}$-6:

As H-1, replacing Celrad 1700 and 3200 with acrylated urethane.

Results:

"Fog", also excessive swelling, cracking and separation.

It was surprising that related acrylic polymers like the acrylated urethane of Mix $\overline{H}$-6 were found to crack and peel under the "Humidity Test" described and/or to fog up as a result of moisture absorption. For instance, a certain variation of H-1 has been noticed to peel and curl on curing, pulling-up the subbing coating and breaking-up into pieces after extreme temp./humidity cycling. And it was surprising that such a hard overcoat could take up so much moisture (evidently the "hard" acrylic coatings are more hydrophilic than realized).

And some additives of the type described seem to fog, shadow or discolor the resulting overcoat. For instance, when one dissolves such a solvent resin into a monomer like MMA (see $\overline{H}$-5), "oil spots" have been seen to result—evidently because some components were prematurely polymerized and precipitated.

Coating methods:

Following are examples of novel techniques for depositing "hard coating" mixtures like those in the foregoing Examples onto OD disk substrates (like FEP) to yield an outer protective overcoat thereof—especially one that is several mils thick, yet highly-uniform, is radiation-cured in situ, giving the mentioned environmental and other protection for such a disk over a prescribed extended life. Workers will recognize that these techniques emphasize convenient, cost-effective methods of coating and curing, with very close control of thickness, and thickness uniformity.

While the subject coating is applied to give a highly uniform thickness of about 7 mils, workers will appreciate that thicknesses of up to about 30 mils have been satisfactorily rendered.

Workers will recognize that "hard coat formulations" like those described are quite apt for a novel "spiral" method of application (e.g., to an OD disk, as below) according to another feature hereof, such material lending itself to such surprising simplicity and ease of dispensing, yet under close control and yielding the described surprisingly-precise control of thickness uniformity.

For instance, knowing the desired coating thickness one may readily convert this to a corresponding bead-mass/per running-cm (gn/cm) value for the "bead", whereby to empirically determine the desired number of spirals, with spiral spacing predetermined by the leveling mechanism (e.g., for a spiral band extending from a radius of about 3.5" to about 7", close to band $B_b$ in FIG. 3, it has been found that 20 to 30 spirals under these conditions gives a very uniform coating approximately 7 mils thick; whereas 10 spirals or less badly upset thickness uniformity; and much more than 30 is too many—in any case, the spirals must not overlap).

Workers may thus compute and control the material dispensing rate, given the contemplated speed of disk rotation (e.g. 4 to 10 rpm here). This simple technique allows one to so apply a constant coating density (i.e., uniform "bead" size requires a certain constant dispensing rate from the nozzle, adjusting nozzle radial translation speed and/or disk rotation speed to keep spacing and bead-size constant, despite the constant variation in the revolution-length of spirals, as will be appreciated). Disk rotation should not be such as to "move" the material or distort it once laid-down and of course should not "centrifuge" it off the disk.

Formulation H-1 will now be described as applied to the OD disk surface d in FIG. 1 in a certain preferred spiral fashion. This will be understood as an aluminum disk on which the described tri-layer optical recording structure has been applied and, over this, a layer of cured "vacuum deposited FEP" (or of a like "soft pad" polymeric surface).

In general, the method will be seen as involving the deposition of the coating material on the prescribed (FEP disk surface in a prescribed number of spiral rows, or "beads"; then inducing the spreading-out, or "leveling", of the "beads" into a very smooth, very uniform coating; and thereafter curing and hardening this coating to render the desired "Hard" protective overcoat. Some particular and preferred forms of this application method will now be described.

EXAMPLE M-1

Application of H-1 to FEP substrate ("solvent-leveling")

Step #1 Mix preparation:

A preferred form of the novel coating method will now be described wherein a preferred Hard coating mix (preferably "H-1" described above), will be understood as selected, prepared and disposed for application to the disk in a spiral row of uniform symmetrical "beads", being thereafter "solvent-leveled" (induce a rapid, highly-uniform "leveling" of the beads on the prescribed FEP surface) with the disk contemporaneously rotated slowly—i.e., only fast enough to compensate for asymmetrical gravitational forces, (wobble, or uneven disk orientation) and slow enough to assure that no centrifugal forces will upset the bi-directional, symmetrical, settling of the material, once so-softened into a smooth, uniform layer.

Figure 5:
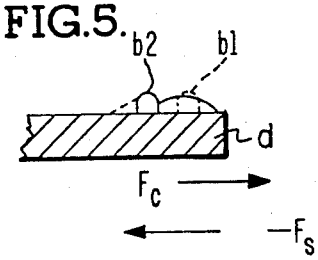
FIG. 5 shows a like sectional view under modified conditions.

STEP #2: Dispense as "Spiral Beads":

More particularly, and with illustrative reference to FIGS. 3, 4, Mix H-1 will be supplied as known by workers to a prescribed controlled-rate dispensing means n (like a syringe-nozzle n, as workers know) affixed on a reciprocable arm A. Nozzle n is adapted and controlled (by known means) to dispense a prescribed, carefully-controlled, uniform stream st of the mix down onto the receiving (FEP) surface of the subject disk d at a constant rate—preferably starting at the disk periphery as indicated in FIG. 3 (this way, centrifugal force $F_c$ is opposed, and to some extent offset by a push-force $F_b$ from an adjacent, spreading bead—as indicated below relative to FIG. 5). Thewhile arm A will be understood as to be continuously shifted radially (inward) of disk d, carefully controlled so that this stream st moves radially of disk d while the disk rotates whereby to describe the specified spiral SR (e.g., arm A translated by a linear motor as with magnetic recording heads —maintaining uniform separation, and size, of the beads). Disk rpm may also be varied, as necessary, (see below). As workers will appreciate, one may vary one or several of the three variables of: disk rpm, arm velocity and dispensing rate, while keeping the other variables constant—to deliver uniform-size beads.

Thus, nozzle n is controllably swept across a prescribed radius of disk d, as the disk is rotated, deploying mix in the continuous uniform spiral SR (of "bead" segments b being of uniform separation, size and shape, as workers in the art will appreciate). The Mix may be supplied to nozzle n via known pressure-orifice control means (not detailed), arranged to dispense at a prescribed constant rate to form such a spiral (e.g., 25 beads across 3.5" radial band $B_b$).

Workers will appreciate the resultant bead-distribution as artistically indicated in the partial sectional schematic view of FIG. 4 showing three adjacent bead rows b. The rows are separated by a prescribed constant gap gg (note: they cannot touch or overlap) and their cross-sectional configuration, size and linear mass will be kept at a prescribed constant value, adapted (by appropriate prior computation, as known in the art) to—once leveled uniformly—result in the desired protective overcoat thickness on the disk d (cf. outer coating g, FIG. 2).

For instance, with Mix H-1 at "normal" (room) temperature and with a substrate surface of polymerized FEP as mentioned, it was found that 20 to 30 spiral segments b uniformly arrayed across a disk band about 3.5" wide, starting at a radius of about 3.5", can be "solvent-leveled" to yield a highly uniform coating about 7 mils thick (assuming appropriate leveling and curing). On the other hand, 10 rows or fewer reduced coating thickness too much and made it too uneven. Also, if a minimum gap gg was not maintained and, especially if the rows SR overlapped, it was virtually impossible to achieve the precise thickness control desired (to $\pm 7$ to 0.7 microns for a 7 mil coating—a uniformity that is quite astonishing for this material and with such simple coating equipment over such a large substrate).

With the dispensing rate thus kept constant, disk rotation may be varied to lay down a uniform bead (e.g., on the order of 4 to 5 rpm at innermost radius, slowing gradually to finish at about 2 rpm at the outermost, thus giving uniform, linear bead-mass). The radial translation of nozzle n by arm A is also controllably varied (according to its distance from disk center) to maintain uniform, equally-spaced rows b, as known in the art. Alternatively, dispensing rate may be varied to render the same uniform spiral, as workers well know.

The specified disk rotation and arm translation will leave the "beads" uniformly spaced (spread-apart, radially, by the prescribed separation gg; e.g., preferably corresponding to the cited 25 beads spread across the 3.5" radial band). Separation distance gg may be varied within limits; but, in any event, "beads" should not "overlap" on the one hand, nor on the other, be so far apart that the contemplated "solvent leveling" won't make them flow together and yield the targeted thickness uniformity. Also, each bead must be wide enough (for its height, i.e., have good w/h ratio) to provide sufficient substrate-contact (area) whereby it may "sit-up" properly. Then, once this spiral beading is fully deposited, stream st is terminated and disk rotation is now set for "solvent-leveling" (preferably about 1-2 rpm).

As mentioned, a Mix like H-1 is attractive for this because it retains a prescribed uniform symmetrical configuration and "sets up" sufficient that "bead slope" relative to the disk surface is relatively "steep" (small "wet angle" relative to the Normal); thus, a bead should not "slump", move, or otherwise deform or change its symmetry (as artistically indicated in FIGS. 4, 5) until contacted for leveling with solvent vapor, whereupon the wet-angle enlarges quickly. As mentioned, the FC-430 additive is designed and selected to control and enhance such wetting and "set-up" of the beads (for such a Mix) on such a (FEP) substrate.

STEP #3: Solvent-leveling:

Next, the spiral array of beads is exposed to a homogeneous "fog" of solvent vapor whereupon the surface of the beads and intervening (FEP) substrate are quickly "wet" (with solvent condensate—preferably yielding a relatively continuous micro-film of condensate across all beads and exposed substrate), such as to immediately drop wetting surface tension and induce the beads to "soften" and quickly "level" (i.e., immediately spread-out, gravity-urged, and symmetrically level themselves into the desired uniform coating). Precise thickness control will be recognized as extremely important; thus, if the so-coated surface of disk d is not absolutely level (and gravitational forces on the beads not entirely symmetrical), one should rotate disk d sufficient to compensate for any unevenness or asymmetry (compensate for "wobble" of the disk face and the like while solvent-leveling, as workers in the art will appreciate).

Thus, as solvent-softening begins disk d is preferably so rotated (e.g., 1-2 rpm here)—so the bead-flow will give relatively perfect coating uniformity—yet not so fast as to induce any centrifugal flow.

To subject disk d (spiral beading thereon) to the prescribed SOLVENT-VAPOR one may place the disk in a hood and admit the vapor at prescribed pressure and concentration (—or otherwise, as workers will appreciate).

Thus for such bead-softening and solvent-leveling, one should select his solvent and attendant conditions so that it will very quickly condense on rows b (beads) and on the intervening FEP substrate as a relatively uniform, continuous film, "wetting" both to one another,—and doing so long enough for the now-softened beads to "slump" and flow (gravity-urged) to cover the adjacent FEP surface (the solvent promoting good "wetting" here of Mix H-1 to the FEP).

Here, for simplicity, it is assumed that acetone is used as the solvent; and that it is simply poured, as a vapor or saturated "fog", onto the bead array, under conditions (cf. ambient temp./press.) permitting it to promptly condense on the beads and across the intervening FEP substrate (e.g., here all these surfaces should suddenly "glisten"—yet exhibit no droplets or gross puddling; i.e., solvent concentration will be kept less than that giving rise to condensation "droplets" or gross puddles on the beads or the disk; one should increase volatility if this occurs). This exposure will be sufficient to immediately soften the subject "beads" so they quickly flow into one another (virtually instantaneously, in this example).

Solvent volatility is preferably kept quite high so that, once the beads and intervening (FEP) disk surface are fully "wetted", the solvent vapor will quickly volatilize and dissipate (or otherwise be withdrawn—e.g. by pumping). Thus, during leveling, little or no solvent should remain present, preferably.

The results of such "solvent-leveling are surprising. Adjacent beads are observed to flow together in a "leveling" action that is surprisingly rapid and that renders a coating uniformity that is remarkable.

Solvent characteristics, modifications:

The solvent will be selected, in light of the subject operating temperature, substrate surface and mix chemistry, so as to decrease the mix surface tension relative to the substrate (here FEP) at this temperature—whereby to soften it and induce a ready flow and "leveling". Thus, the solvent is specified for these conditions and may require adjustment if they change—e.g., for a different coating mix or for a different substrate surface.

One advantage in using a solvent like acetone (here) is that little or no residual solvent remains, unvaporized, before curing starts; otherwise one should substitute a solvent which can be expected to co-polymerize with the coating Mix H-1 (cf methyl acrylate solvents can be so co-polymerized); and that will nowise inhibit polymerization or otherwise interfere with desired characteristics.

Alternatively, in certain instances a styrene monomer may be used as the leveling solvent providing it is made sufficiently volatile, or a solvent like ethyl acetate, methylene chloride or methyl ethyl ketone (MEK), as workers in the art will recognize. Styrene can be expected to copolymerize, to some extent at least, with the acrylic mix; but the others will not and this should be fully volatilized-away.

Thus, it will be realized that changing the characteristics or chemistry of the disk surface (e.g., with a thin oxide "flash coating" on FEP) will usually change "wetting" characteristics and so change its "leveling action" one way or the other—often requiring a different solvent vapor. For instance, a thin film of $Al_2O_3$ or SiO or $SiO_2$ on the FEP is seen to increase, and accelerate, wetting, especially when using the mentioned acetone solvent vapor.

Also, with such a "solvent-leveling", one will preferably formulate the mix (such as H-1 ) so that it does not, originally, wet the substrate "too well"—otherwise it would not "set up" on the substrate well enough to retain its shape while the spiral is applied; e.g. it might slump asymmetrically under centrifugal force as the disk is rotated during spiral formation and before contact with solvent. An additive promoting "set up" like the FC-430 "surfactant" helps in this respect, of course. For similar reasons, the beads should have sufficient contact-area with the substrate.

Control of mix viscosity is found to be very important to get good distribution and uniform settling. For instance, adding a more volatile monomer like MMA to Mix H-1 may very likely produce a condensate between beads b, with too much wetting of the FEP substrate, such as to induce inadequate "set up" and premature "settling" of the beads.

Contrariwise, care should be taken to avoid "holidays" or "pinholes" (voids where little or no solvent condenses, giving a different "wetting" there or none at all—note: increased ambient temperature seems to enlarge such voids, probably because too much solvent evaporates too fast).

Of course, where the mix can be made to immediately "self-level", it may not require any solvent exposure (and also may not need a surfactant like FC-430 to "set-up" the mix—see below, M-2).

STEP #4: (curing):

With leveling complete and the coating thus evenly distributed across the face of disk d, it will now be cured, in situ, (and otherwise treated) to yield the desired hard protective overcoating. Thus, disk rotation may cease and the disk be subjected to curing conditions—preferably without moving it from the "solvent leveling" station, lest coating uniformity be disturbed or contaminants be introduced (e.g., dust settle on the now-tacky surface).

Thus, UV curing is invoked at the solvent-leveling station. That is, with the material evenly spread across the subject disk surface, the coating is photo-cured by exposure to ultraviolet light under an inert atmosphere (e.g., $N_2$ flush to expel all oxygen) until the coating is properly cured and "hard". We find about 5-20 seconds total exposure to 0.3-0.4 $\mu$m UV (e.g., 100 mW/cm$^2$ intensity at 0.366 um.) satisfactory.

Alternatively, workers will understand that other like curing methods (e.g., e-beam or IR radiation) may be used in certain instances, with appropriate adjustments (e.g., of the type, concentration of photo-initiator).

Results:

As mentioned before, the thickness uniformity (on the order of ±7 to 0.7 $\mu$m. over a 3.5" band for a nominal 7 mil coating) is quite remarkable, especially in view of the simplicity of the application apparatus and the type of coating mixture involved. As mentioned, the cure times and temperatures are quite convenient, as are the rest of the treatment conditions.

Somewhat surprising was the fact that, where temperature (heat) was increased significantly during this solvent-leveling (of spiral rows b), an increased flow rate and faster leveling did not result; instead, the rows seemed to "bead-up" more and contract rather than spread-out —the cause is not known for certain, but one suspects that the solvent (acetone vapor) became too hot to properly condense and wet the surfaces.

EXAMPLE M-2

(no "solvent-leveling")

Example M-1 is repeated except as otherwise specified below, with the beads being laid down in virtual contiguous contact, or near-contact, to induce immediate "self-leveling", without need to invoke a solvent-leveling step.

More particularly, the Hard coating mix (e.g. H-1) is again prepared (FC-430 may be unnecessary—see above) and is dispensed on the disk as a continuous spiral array, except that the inter-bead gap gg (FIG. 4) is reduced to zero, essentially. This is indicated rather schematically, in idealized sequential fashion in FIG. 5 where an initial bead b-1 is shown in phantom. Bead b-1 will virtually immediately "slump" and level itself (b-1 in full-line) so that when the adjacent bead, b-2, is laid down it will likely be contiguous with b-1 ("as spread" a bit). The "spreading action" of b-1 will tend to urge b-2 toward the disk center (see spread-force $F_s$). Thus, each successive bead will be so-urged to spread-itself, somewhat assymetrically, toward disk-center (see b-2 in phantom). The "outside-in" mode of laying down the spiral is intended to oppose the centrifugal force component ($F_c$), due to disk-spin, to spread-force $F_s$ (see FIG. 5 arrows).

Workers will also recognize that an appropriate reduction in the viscosity of the mix will be called-for here, depending on the temperature/substrate conditions, to cause the so-dispensed (spiral rows) mix pattern to "level-itself" without need for application of a "leveling solvent". Certain other accommodating adjustments will also be advisable; such as slower disk rotation (or none at all) and likely replacement of FC-430 by a different surfactant. agent. Of course, the problem of maintaining the surface of disk d exactly level will still be present; thus, suggesting an appropriate disk rotation to compensate for "wobble" or uneven "G-forces".

Thus, with the beads so rendered "self-leveling", and solvent-leveling in most cases, eliminated a simpler "one-step" coating-sequence is realized. The curing will be carried out as in M-1 and the resultant coating results will be essentially the same as in M-1, (actually, better uniformity in some cases).

Of course, as before, the three factors of flow-rate ($r_f$, from nozzle n onto disk), disk rpm ($w_d$) and arm velocity ($v_a$) will, in any event, be adjusted to deliver beads of uniform size and shape, despite variations in bead-position (i.e. in the radial position $d_b$ of each bead-segment).

Figure 6:
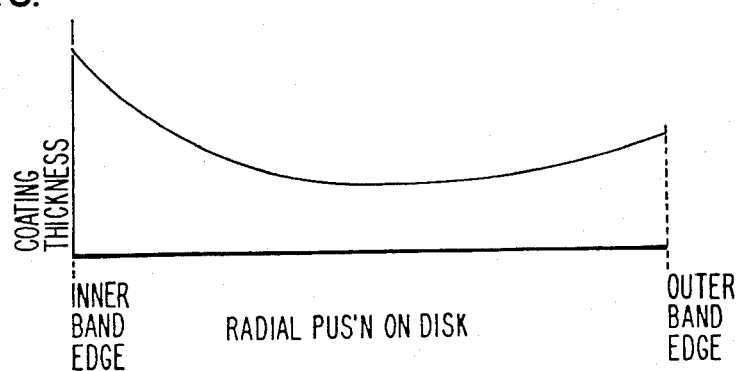
Figures 7, 8:
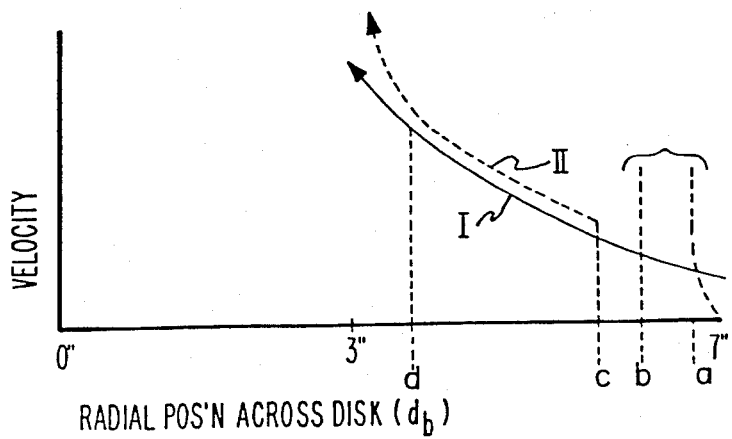
FIG. 8 is a plot of Table rpm and arm velocity as a function of radial position on a disk, these values being tabulated in FIG. 7.

As a specific example of this, FIGS. 6, 7 and 8 are offered.

FIG. 6 depicts (very schematically) how final coating thickness $t_c$ will vary across the disk radius, with flow rate ($r_f$) kept constant; disk rpm ($w_d$) and arm velocity ($v_a$) are rather uniformly increased (e.g. in roughly 2:1 fashion, starting from disk periphery). It becomes apparent that this "self-settling" action is complicating the uniform coating process.

To remedy this, we propose coating under a modified mode with rpm continuing to increase ($\Delta w_d = \alpha_d = \phi$ radius) and with arm acceleration ($a_a = \Delta v_a/t$) first increasing some, then decreasing some, and finally increasing ($a_a = \phi'$ radius) in the fashion indicated in FIGS. 7 and 8. Disk rpm will, in any case, preferably be minimized: i.e., generally, just about enough to allow the spirals to "inter-flow".

Heretofore, workers have proposed other methods of applying a "defocusing overcoat". For instance, in U.S. Pat. No. 4,340,959 to Levin, a silicone resin (or epoxy) coating of 0.05–1.0 mm. is proposed in a coating technique requiring that the disk be configured as a mold; and also rejecting "spinning" methods of application (and see references cited in Levin).

In FIG. 7, variations in $w_d$ and $v_a$ are tabulated as a function of bead-position ($d_b$), with flow-rate held constant. In FIG. 8, then values are plotted in somewhat idealized fashion. Slider velocity variance (acceleration) has been found to be somewhat surprising; with gradual increasing velocity at first (position a→b on Curve II, FIG. 8), then dropping steeply (position b→c), to finally assume a continually increasing mode (exponential increase, see position c→d, etc.). It is theorized that at first, bead-pressure is "light", then it increases, necessitating a slider arm deceleration (position b→c), until a sort of equilibrium is reached (position e), whereupon decreasing bead-arc requires a relatively continuous acceleration (c→d).

Example M-3: (SiO$_2$ flash on FEP):

And, whatever coating application techniques is used, it may be advisable to pre-treat the substrate as suggested above to enhance wetting adhesion or other characteristics. For instance, in following Example M-1 above (H-1 as spirals onto FEP, then solvent-leveled), or a modification thereof, one may wish to enhance the hydrophilicity of the (FEP) substrate and wetting thereto of the H-1 beads. In such a case, we have found it advantageous to apply a very light "flash" coating of SiO$_2$ on the FEP, prior to applying the beads (of H-1 or the like, e.g., SiO$_2$ on layer f of FIG. 2).

Example M-4: (as M-1, FEP sandwiches the absorber):

Sample IV is duplicated, with both FEP layers being vapor-deposited from a vacuum chamber in common with the tri-layer. The FEP "spacer" is of $\frac{1}{4}$ n $\lambda_r$ optical thickness, while the FEP "soft pad" supercoat is about 1–2 $\mu$m. thick (e.g. preferably the order of 100× the thickness of the absorber film). The "Hard" overcoating is thick enough to defocus surface dust, etc. and is applied, as in the preferred Method M-2 above.

Alternative uses:

Workers will recognize that one may prepare and apply such a "Hard" coating to other, somewhat different, surfaces, such as on a modified "soft pad" coating. And, even where the substrate surface is radically different (e.g., a silicone elastomer like GE's RTV), workers will recognize that an "otherwise-unsuitable" substrate may be pre-coated or otherwise treated, in certain instances, to accommodate application of a "Hard overcoat" as above. For instance, in the plastic coating and converting arts, ways are known for treating a wide variety of polymeric substrates to enhance their "wettability" (e.g., by electrical discharge, or by oxidizing lightly, as with an agent like a halogen or active oxidizer, or by lightly burning as with a propane torch—also by interposing a pre-coat like SiO$_2$ as mentioned before). Such may, in appropriate instances, be adopted and combined with the invention.

It will be understood that the preferred embodiments described herein are only exemplary, and that the invention is capable of many modifications and variations in construction, arrangement and use without departing from the spirit of the invention.

For example, "soft pad" coatings like those disclosed herein will also be applicable for protecting other substrates and/or with other super-coatings (e.g. to advantageously use the imparted "isolation"). Also, the present invention is applicable for providing "isolation layers" adjacent other similar recording material.

And, "Hard" outer coatings like those here taught may, of course, be used to cover and protect other substrates for like purposes; also the described "spiral" coating methods may be used with other materials (with appropriate adjustments). And further, such coating structures may in appropriate instances be otherwise rendered—e.g. deposit a "soft pad" onto a "Hard coating" substrate (e.g. a 7 mil acrylate disk), then deposit absorber onto soft pad, then deposit spacer/reflector, etc., onto absorber as required; and, finally, applying adhesive and press-bonding this onto associated "Winchester disk", or like "carrier".

Further modifications of the invention are also possible. For example, the means and methods disclosed herein are also applicable to "soft-pad coated" recording tape, floppy disks and the like. Also, the present invention is applicable for providing a like protective outer coating for media used in other forms of recording and/or reproducing systems, such as those in which data is recorded and/or reproduced using IR exposure.

The above examples of possible variations of the present invention are merely illustrative. Accordingly, the present invention is to be considered as including all possible modifications and variations coming within the scope of the invention as defined by the appended claims.

What is claimed is:

1. A method of applying a relatively "hard" outer-seal coating of moderate-to-high viscosity to a disk substrate to yield very high thickness uniformity, this substrate including at least one recording area wherein information is to be recorded with prescribed radiation, the method comprising the steps of:

formulating a coating mixture to comprise the polymerization product of a formulation including at least one acrylate pre-polymer;

applying this mixture in a prescribed stream to the outer surface of the recording area, while rotating it at a prescribed rpm, so as to form one or several annular bead segments, extending circularly or spirally about the disk surface;

the mixture being so formulated and so applied as to be capable of leveling and so rendering the desired coating; this coating serving as a mechanical/chemical barrier, while also being relatively transparent to said radiation.

2. The method as recited in claim 1 wherein the mixture is so formulated and the bead segments are so distributed, in contiguity or near-contiguity to one another, as to be "self-leveling".

3. The method as recited in claim 1 wherein the mixture is dispensed through a nozzle, being formulated to exhibit a prescribed viscosity apt for such dispensing, as well as to exhibit a prescribed thixotropy and wetting characteristic relative to said disk surface whereby the beads will "set-up" thereon for sufficient time to allow the leveling action.

4. The method as recited in claim 3 wherein the formulation includes one or more acrylate pre-polymer entities, and a compatible co-functional low molecular weight flexibilizing diluent, together with sufficient low viscosity cross-linker to give the desired coating toughness, plus sufficient compatible low molecular weight diluent to give the needed low viscosity for application to the disk surface; and also sufficient of a prescribed "setting-surfactant" to promote this bead "set-up".

5. The method as recited in claim 4 wherein the pre-polymer entities include a clear, high molecular weight acrylate plus sufficient related low molecular weight compatible diluent to reduce viscosity to allow convenient spreading of the formulation.

6. The method as recited in claim 5 wherein the cross-linker comprises a multi-functional acrylate like a tri-acrylate or trimethacrylate of tri-methyl-ol propane.

7. The combination as recited in claim 6 wherein the entities comprise a high molecular weight acrylated acrylate plus sufficient low molecular weight acrylated epoxide to so reduce viscosity.

8. The combination as recited in claim 7 wherein the formulation also includes sufficient of an organic flexibilizer-diluent to further lower viscosity enough for convenient application spreading.

9. The combination as recited in claim 8 wherein the formulation includes a hardness-moderating diluent acrylate like an acrylate of an ethyl hexyl group.

10. The combination as recited in claim 4 wherein the record unit is an optical mass memory disk for laser recording and wherein the coating is the order of several mils thick, being applied over a recording layer, or over a thin super-coat thereon.

11. The combination as recited in claim 6 wherein the pre-polymer entities are radiation-cured.

12. A method of providing a protective outer-seal coating of very high thickness-uniformity over a disk having at least one recording area wherein information is to be recorded with prescribed radiation, the method including the steps of:

preparing a formulation including at least one acrylate pre-polymer; applying this formulation to the outer surface of the recording area, while rotating it at a prescribed rpm, so as to form one or several annular bead segments, extending circularly or spirally about the disk surface;

this mixture being so formulated and so applied as to be capable of leveling and so rendering the desired coating; this coating serving as a mechanical/chemical barrier, while also being relatively transparent to said radiation; and curing the coating in situ.

13. The method as recited in claim 12 wherein the coating is applied to a thickness of one or several mils, yet so as to maintain precise thickness-uniformity, on the order of a few $\mu$m across a span of several inches or more.

14. The method as recited in claim 12 wherein the formulation includes one or more acrylate pre-polymer entities, and a compatible co-functional low molecular weight flexibilizing diluent, together with sufficient low viscosity cross-linker to give the desired coating necessary toughness and strength, plus sufficient compatible low molecular weight diluent to give the needed low viscosity for application to the disk surface.

15. The combination as recited in claim 14 wherein the pre-polymer entities include a clear, high molecular weight acrylate plus sufficient related low molecular weight compatible diluent to reduce viscosity to allow convenient spreading of the formulation.

16. The combination as recited in claim 15 wherein the cross-linker comprises a multi-functional acrylate like triacrylate or trimethacrylate of tri-methyl-ol propane.

17. The method as recited in claim 3 wherein the mixture is so formulated and the bead segments are so distributed, in contiguity or near-contiguity to one another, as to be "self-leveling".

18. The method as recited in claim 3 wherein the bead-forming step is followed by application of a prescribed relatively uniform, continuous "solvent-mist" of a prescribed solvent for said mixture, this mist being applied to coat the so-applied beads and the intervening disk surface relatively continuously, this solvent being selected and applied so as to induce and enhance said leveling.

19. The method as recited in claim 4 wherein the bead is applied as one continuous spiral with successive adjacent segments kept spaced by a prescribed bead-spacing apt for such leveling action.

20. The method as recited in claim 6 wherein the mixture is dispensed through a nozzle, being formulated to exhibit a prescribed viscosity apt for such dispensing, as well as to exhibit a prescribed thixotropy and wetting characteristic relative to said disk surface whereby the beads will "set-up" thereon for sufficient time to allow the leveling action.

21. The method as recited in claim 20 wherein the mixture is formulated to include said prescribed "setting-surfactant" specified for the indicated "wetting", while also imparting said "set-up" action of the beads.

22. The method as recited in claim 1 wherein the mixture includes at least one acrylate plus at least one associated viscosity-controlling diluent and a compatible cross-linking entity, along with one or more compatible surfactants adapted for promoting "wetting" of the beads to the disk surface and bead "set-up".

23. The method as recited in claims 22 or 21 wherein the disk surface is comprised of a prescribed polymer and where a corresponding surfactant is included, tailored to impart said wetting of the beads and this polymer surface, as well as to "set-up" the beads.

24. The method as recited in claim 23 wherein the solvent-leveling is achieved by application of an ultra-thin continuous film of a solvent like acetone, ethyl acetate, methylene chloride or methyl-ethyl-ketone.

* * * * *

UNITED STATES PATENT AND TRADEMARK OFFICE
CERTIFICATE OF CORRECTION

PATENT NO. : 4,492,718

DATED : January 8, 1985

INVENTOR(S) : Thomas Mayer, et al.

It is certified that error appears in the above-identified patent and that said Letters Patent is hereby corrected as shown below:

```
Col.  1, line 13, change "1982" to --1982:--.
Col.  2, line 42, change "R/W)" to --(R/W)--.
Col.  7, line 16, change "proteqtive" to --protective--.
Col. 10, line 52, change "≲" to --≤--.
Col. 16, line 25, change "Subtrate:" to --Substrate:--;
         line 41, change "a" to --A--.
Col. 17, line 68, change "t_s = ½nλr," to --t_s = ½ nλ_r,--.
Col. 18, line 12, change "tnickness" to --thickness--.
Col. 25, line  3, change ""swell-craking"." to
                  --"swell-cracking".--.
Col. 26, line 29, change "(gn/cm)" to --(gm/cm)--.
Col. 32, line 29, change "(position e)," to --(position c),--.
```

Signed and Sealed this

Seventh Day of January 1986

[SEAL]

Attest:

DONALD J. QUIGG

Attesting Officer

Commissioner of Patents and Trademarks